(12) United States Patent
Wilson

(10) Patent No.: US 11,724,806 B2
(45) Date of Patent: Aug. 15, 2023

(54) MONO-WINGED DRONE

(71) Applicant: Roland Industries, Inc., Pasadena, CA (US)

(72) Inventor: Jonathan Wilson, Pasadena, CA (US)

(73) Assignee: Roland Industries, Inc., Pasadena, CA (US)

( * ) Notice: Subject to any disclaimer, the term of this patent is extended or adjusted under 35 U.S.C. 154(b) by 0 days.

(21) Appl. No.: 17/451,619

(22) Filed: Oct. 20, 2021

(65) Prior Publication Data

US 2022/0119113 A1 Apr. 21, 2022

Related U.S. Application Data

(60) Provisional application No. 63/094,206, filed on Oct. 20, 2020.

(51) Int. Cl.
| | |
|---|---|
| *B64C 13/50* | (2006.01) |
| *B64U 10/25* | (2023.01) |
| *B64C 39/02* | (2023.01) |
| *B64C 39/10* | (2006.01) |
| *B64D 1/02* | (2006.01) |
| *B64C 23/06* | (2006.01) |
| *B64C 25/14* | (2006.01) |
| *B64U 50/19* | (2023.01) |
| *B64U 50/34* | (2023.01) |

(52) U.S. Cl.
CPC ............ *B64C 39/024* (2013.01); *B64C 13/50* (2013.01); *B64C 23/076* (2017.05); *B64C 25/14* (2013.01); *B64C 39/10* (2013.01); *B64D 1/02* (2013.01); *B64U 10/25* (2023.01); *B64U 50/19* (2023.01); *B64U 50/34* (2023.01)

(58) Field of Classification Search
CPC . B64C 13/50; B64C 23/076; B64C 2201/028; B64U 10/25
See application file for complete search history.

(56) References Cited

U.S. PATENT DOCUMENTS

| | | | |
|---|---|---|---|
| 1,435,139 A | 11/1922 | Mummert | |
| 1,504,467 A | 8/1924 | Ferdon | |
| 3,285,541 A | 11/1966 | Fehring et al. | |
| 3,638,887 A | 2/1972 | Thurston | |
| 4,377,267 A * | 3/1983 | Haworth | B64C 23/069 244/199.4 |

(Continued)

FOREIGN PATENT DOCUMENTS

| | | |
|---|---|---|
| WO | 2018208652 A1 | 11/2018 |
| WO | 2022087607 A1 | 4/2022 |

OTHER PUBLICATIONS

International Search Report and Written Opinion for International Application No. PCT/US2021/071952, Search completed Dec. 31, 2021, dated Feb. 3, 2022, 19 Pgs.

(Continued)

*Primary Examiner* — Brady W Frazier
*Assistant Examiner* — Shanna Danielle Glover
(74) *Attorney, Agent, or Firm* — Kppb LLP

(57) ABSTRACT

An aircraft with a variety of control surfaces including but not limited to multiple winglet rudders. Each winglet can have multiple independently controlled rudders to improve the flight stability and maneuverability of the aircraft. Additionally, improved power supply systems can be implemented to allow for sustained flight.

22 Claims, 25 Drawing Sheets

(56) References Cited

U.S. PATENT DOCUMENTS

| | | | |
|---|---|---|---|
| 4,566,657 A | 1/1986 | Grow | |
| 5,088,665 A | 2/1992 | Vijgen et al. | |
| 5,100,081 A | 3/1992 | Thomas | |
| 7,900,877 B1 * | 3/2011 | Guida | B64C 23/065 |
| | | | 244/199.4 |
| 8,925,857 B2 | 1/2015 | Luther | |
| 2007/0029440 A1 * | 2/2007 | Shepshelovich | B64C 39/028 |
| | | | 244/190 |
| 2008/0116322 A1 * | 5/2008 | May | B64C 23/076 |
| | | | 244/199.4 |
| 2010/0123047 A1 * | 5/2010 | Williams | B64C 39/028 |
| | | | 244/35 R |
| 2011/0024556 A1 * | 2/2011 | Cazals | B64C 23/076 |
| | | | 244/99.12 |
| 2011/0127383 A1 | 6/2011 | Guida | |
| 2017/0253322 A1 * | 9/2017 | Krebs | B64C 39/04 |
| 2018/0043985 A1 | 2/2018 | Thompson | |
| 2018/0079482 A1 | 3/2018 | Ivans et al. | |
| 2019/0061910 A1 | 2/2019 | Kota et al. | |
| 2020/0130817 A1 | 4/2020 | White | |
| 2020/0203087 A1 * | 6/2020 | Wardle | H01M 50/40 |
| 2020/0252005 A1 | 8/2020 | Voller et al. | |
| 2021/0354816 A1 * | 11/2021 | Oliveira | B64C 23/069 |

OTHER PUBLICATIONS

"Flite Test—Rudders on Wings—Project", Printed from https://www.youtube.com/watch?v=4XamOVBEHMY, Oct. 8, 2011, 3 pgs.

"Forgotten aircraft—Armstrong-Whitworth AW-52 flying wing", Jul. 28, 2007, Printed from https://www.youtube.com/watch?v=7H1tyMRtcho, 3 pgs.

"Why Don't Airliners Have Rudders on the Winglets", Printed from https://aviation.stackexcchange.com/questions/19638/why-dont-airliners-have-rudders-on-the-winglets, Aug. 27, 2015, 5 pgs.

Hageman, "Rudder Incorporated Winglet Design for Blended Wing Body Aircraft", Thesis, 2016, 105 pgs.

* cited by examiner

MONO-WINGED DRONE

FIELD OF THE INVENTION

This application claims priority to U.S. Provisional Patent Application No. 63/094,206 filed on Oct. 20, 2020. The disclosure of which is incorporated herein by reference in its entirety.

FIELD OF THE INVENTION

The present invention relates generally relates to drones and aircraft of the like. More specifically, this is related to mono-winged aircraft with improved control characteristics.

BACKGROUND OF THE INVENTION

Drones and other small aircraft have been of great interest in the last few years. Many drones or small aircraft have been in development for use in a number of different industries including surveillance, product delivery, real estate, personnel transport, and entertainment. Many developers have worked to include autonomy to the vehicles to remove the human control element and thus help improve the overall functionality of the aircraft. Many developers have included designs that include multiple rotors that can generate lift and thrust to propel an aircraft. Additionally, some manufactures have incorporated various other components to help improve the overall flight characteristics, including fixed wings and/or control surfaces. In some ways, manufactures can be limited in the overall design of an aircraft by the types of maneuvers desired as well as the potential for payload. The change in design and/or payload can affect the respective aerodynamic forces that contribute to the flight of the aircraft and thus lead to additional rotors or control surfaces to help maintain the desired flight characteristics.

Despite the advancements in such aircraft, many manufactures continue to use more traditional designs of control surfaces on fixed wings as well as the addition of more rotors or propellers to help compensate for aerodynamic forces that affect the control of the aircraft when subject to different load patterns. Moreover, many manufactures fail to take advantage of the various design characteristics that can improve functionality and flight characteristics of the aircraft.

SUMMARY OF THE INVENTION

Many embodiments are directed to an aircraft with a fixed wing portion that has a first and a second wing tip and a front portion and a rear portion such that the fixed wing portion forms a substantial portion of a body of the aircraft. The aircraft has at least two winglets where one of the winglets is disposed at the first wing tip and the second winglet is disposed at the second wingtip, wherein each of the winglets has a winglet body that is elongated and extends upward away from an outer surface of the fixed wing portion of the aircraft. Each of the at least two winglets are configured with two rudders that are individually movably connected to the winglet body and have at least a stored portion and at least one deployed position. The stored position places each of the two rudders substantially flat against the winglet body, and the deployed position places each of the two rudders substantially away from the winglet body.

In other embodiments, the aircraft has more than one deployed position.

In still other embodiments, the at least two rudders have a rectangular shape.

In yet other embodiments, at least two rudders have a contoured shape.

In still yet other embodiments, the contoured shape has an upper edge and a lower edge and wherein the lower edge runs substantially parallel to an upper surface of the wing portion and wherein the upper edge is contoured to match a shape of the at least two winglets.

In other embodiments, the at least two rudders have a trailing edge that is configured with an alternating tooth pattern such that the alternating tooth pattern extends along the trailing edge from a top portion to a bottom portion of the at least two rudders.

In still other embodiments, the aircraft has rudder support elements disposed within the body of each of the at least two winglets and configured to provide structural support for each of the at least two rudders when in a stored position, and wherein the rudder support elements also provide structural support for the at least two winglets when the at least two rudders are in the deployed position.

In yet other embodiments, the aircraft has a rudder control motor, wherein the rudder control motor is disposed within the body of each of the at least two winglets and is mechanically connected to each of the at least two rudders such that the control motor can be configured to control the movement of the rudders between the open and closed positions.

In still yet other embodiments, the rudder control motor is connected to a movement control mechanism and wherein the movement control mechanism is moveably connected to each of the at least two rudders by at least one control arm such that the movement of the at least one control arm can position each of the at least two rudders in between the closed position and the deployed position.

In other embodiments, the movement control mechanism is configured to position each of the at least two rudders in more than one deployed position.

In still other embodiments, the movement control mechanism positions only a some of the rudders in a deployed position and other rudders in the closed position.

In yet other embodiments, the movement control mechanism comprises a body element configured to act as a housing for the rudder control motor and wherein the actuation of the rudder control motor can cause the movement control mechanism to rotate with the rotation of the motor.

In still yet other embodiments, the at least one control arm is segmented and configured to extend outward from the movement control mechanism when the rudders are in the deployed position and is configured to wrap around the movement control mechanism when the rudders are in the closed position.

In other embodiments, the aircraft has at least one control surface on a trailing edge of the fixed wing portion.

In still other embodiments, the aircraft has a first and second control surface disposed on a trailing edges of the fixed wing portion.

In yet other embodiments, the first control surface is smaller than the second control surface.

In still yet other embodiments, the first control surface is disposed near a centerline of the aircraft and the second control surface is disposed near the winglets.

In other embodiments, the aircraft has landing gear, wherein the landing gear is movably connected to an bottom portion of the body of the aircraft such that the landing gear can be placed in a folded position and an open position, wherein in the open position the landing gear is disposed away from the body of the aircraft and when in the closed position the landing gear is disposed near the body of the aircraft.

In still other embodiments, the aircraft is configured to carry a payload.

In yet other embodiments, the payload is disposed on or near a bottom portion of the aircraft such that the payload is deliverable.

In still yet other embodiments, the payload is disposed within a payload delivery system that is configured to be removable from the aircraft.

In other embodiments, the aircraft has a power system wherein the power system is connected to a motor system designed to provide thrust to the aircraft and wherein the power system further comprises at least one power supply manifold that has an elongated body and is configured with a plurality of nanotube arrays and is configured to interact with airflow around the aircraft during flight such that the nanotube arrays collect positive or negative ions to charge a battery component within the power system.

Additional embodiments and features are set forth in part in the description that follows, and in part will become apparent to those skilled in the art upon examination of the specification or may be learned by the practice of the disclosure. A further understanding of the nature and advantages of the present disclosure may be realized by reference to the remaining portions of the specification and the drawings, which forms a part of this disclosure.

DESCRIPTION OF THE DRAWINGS

The description will be more fully understood with reference to the following figures, which are presented as exemplary embodiments of the invention and should not be construed as a complete recitation of the scope of the invention, wherein.

DETAILED DESCRIPTION OF THE INVENTION

Figure 1:
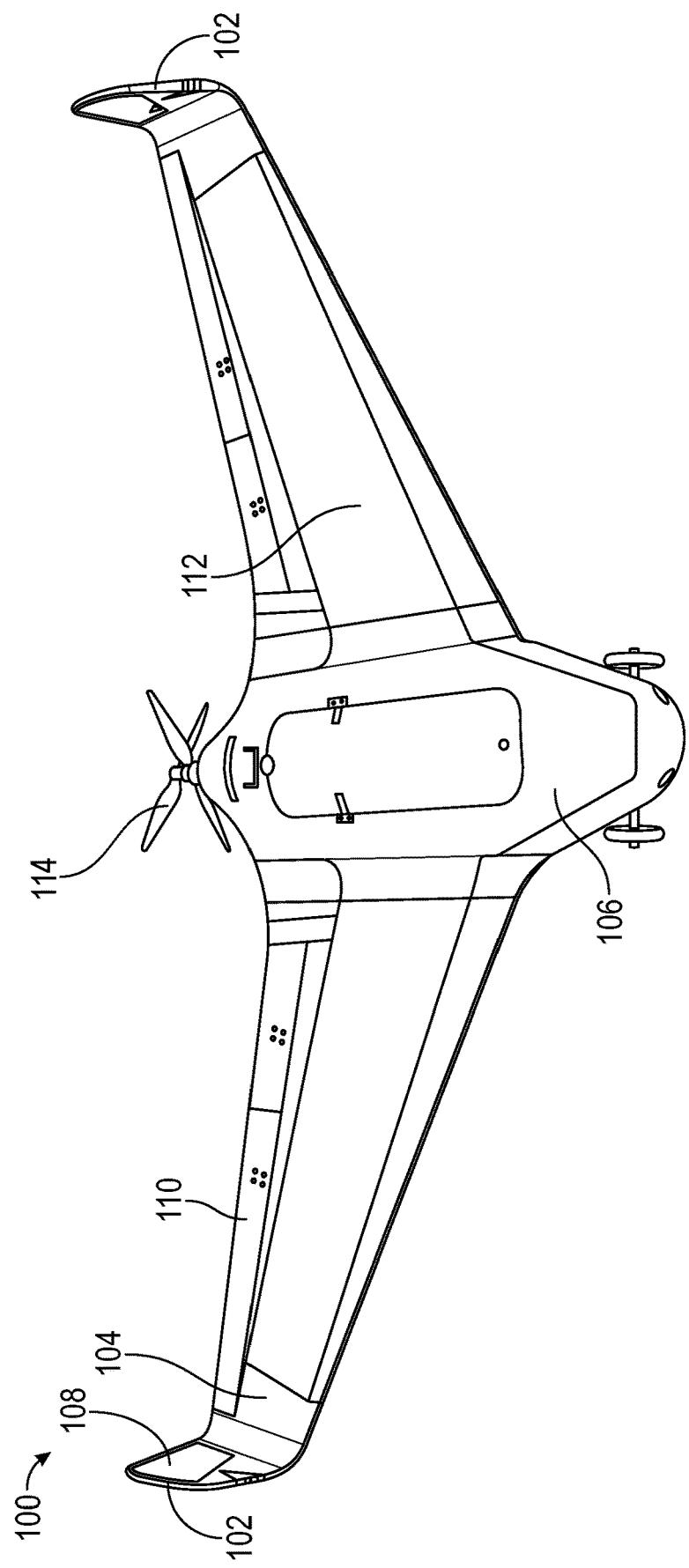
FIG. 1 illustrates a top view mono-wing drone in accordance with embodiments of the invention.

Turning now to the drawings, many embodiments include a mono-wing aircraft with a number of different control surfaces. In many embodiments, the control surfaces have a variety of different configurations that allow for improved controllability of the aircraft. For example, many embodiments of a mono-wing drone have multiple winglets located at each end of the respective wings. The winglets in various embodiments are configured to have multiple control surfaces that are integrated within each of the winglets such that the actuation of the winglet control surfaces introduce drag and allow for improved control over the aircraft. In other embodiments, the wing portions of the aircraft also have wing control surfaces that can improve the maneuverability of the aircraft.

Traditional aircraft, including drones and small aircraft can have a number of different configurations. For example, many drones or other aircraft can have lift surfaces such as fixed wings and/or rotational propellers or rotors. The combination of wings and/or rotors that can generate the necessary lift and propulsion forces for flight. Additionally, traditional aircraft have a number of different control elements that can act to maneuver the aircraft. For example, many fixed wing aircraft have elevators and one or more stabilizers. Stabilizers traditionally include a rudder element that can move in and out of the airflow around the vehicle. Stabilizers and rudders can be located in a number of different locations that may be advantageous to move air depending on the overall aircraft configuration. The movement into the airflow can introduce drag or turbulence in the airflow around the vehicle that can ultimately allow the aircraft to be directionally controlled while in flight. The rudders can be one of a number of different control surfaces that, like the rudders, can introduce drag to control the directionally flight of the vehicle. In addition to the number of different mechanical control elements on an aircraft like drones, aircraft traditionally have a number of different methods used to control the aircraft. Some may use human interaction while others may be configured for autonomous control.

Mono-wing aircraft have been in use for a number of decades and in a number of different applications. Mono-wing refers to an aircraft that primarily uses a fixed wing element as the primary source of lift. Additionally, the entire or majority of the aircraft is considered one large wing. In other words, there is little to no recognizable fuselage. These designs can be effective in some applications, but often require careful design consideration in order to maintain stable flight without significant stress added to the structure. For example, a traditional aircraft will have a fuselage or body with fixed wing elements attached to it. Additionally, the fuselage or body has some type of vertical stabilizer, typically in the form of a tailfin. The wing elements help to provide lift and some control while the tailfin can help stabilize the flight and improve the overall control of the aircraft. Mono-wing aircraft do not have the stabilizers and therefore have to rely on additional control surfaces in order to control the flight and prevent unwanted wing twist.

Many mono-wing designs include a number of different rotors and control surfaces as discussed above to help control the yaw, pitch and roll of the aircraft. However, despite the many different aircraft configurations and control surfaces that can be used in aircraft design, many of the current designs fail to take advantage of alternate vehicle configurations that can used to improve flight characteristics and controllability of an aircraft. This can be in part due to the effects that some control surfaces have on the yaw, pitch, roll, and wing twist. Wing twist often requires additional stiffeners to be used to strengthen the structure of the aircraft; which inherently adds unwanted weight. In contrast, many embodiments described herein illustrate an aircraft with a number of different control elements, specifically configured and placed about a mono-wing body that can help to improve the overall control of a mono-wing aircraft. Furthermore, many embodiments can include additional elements that help to improve landing and overall flight capabilities such as improved landing gear components and improved power train features.

Turning now to the figures, many embodiments are directed to a mon-wing design that is configured with additional stabilizing winglets capable of effectively controlling the yaw of the vehicle through actuated winglet door panels. For example, FIG. 1 illustrates an embodiment of a mono-wing aircraft 100 with winglet airfoils 102 located at the end of each portion of the wing 104. In some embodiments, the aircraft 100 may have a small fuselage 106 that houses elements such as the motor, batteries or power source, as well as the landing gear. The fuselage can take on any number of forms such that it maintains the overall mono-wing configuration. Winglets are not necessarily new to aircraft design. Many traditional aircraft have wing tips that curve upward giving them a type of winglet. In contrast, many embodiments illustrated herein are configured with winglet control surfaces 108 that help to stabilize the flight and improve maneuverability. In addition to the winglets with control surfaces 108, many embodiments may have multiple control surfaces 110 on the wing portion of the aircraft 112. The additional control surfaces are designed to manipulate the airflow around the aircraft and allow for improved control during flight. Many embodiments may be equipped with a propulsion device 114 that is located near a rear portion of the fuselage 106. The propulsion system 114 can be any number of suitable systems such as a a propeller or combination of propellers. Although not illustrated, some embodiments my opt to use a turbine or other type of propulsion system to generate the thrust needed to create lift in the aircraft 100.

Figure 2:
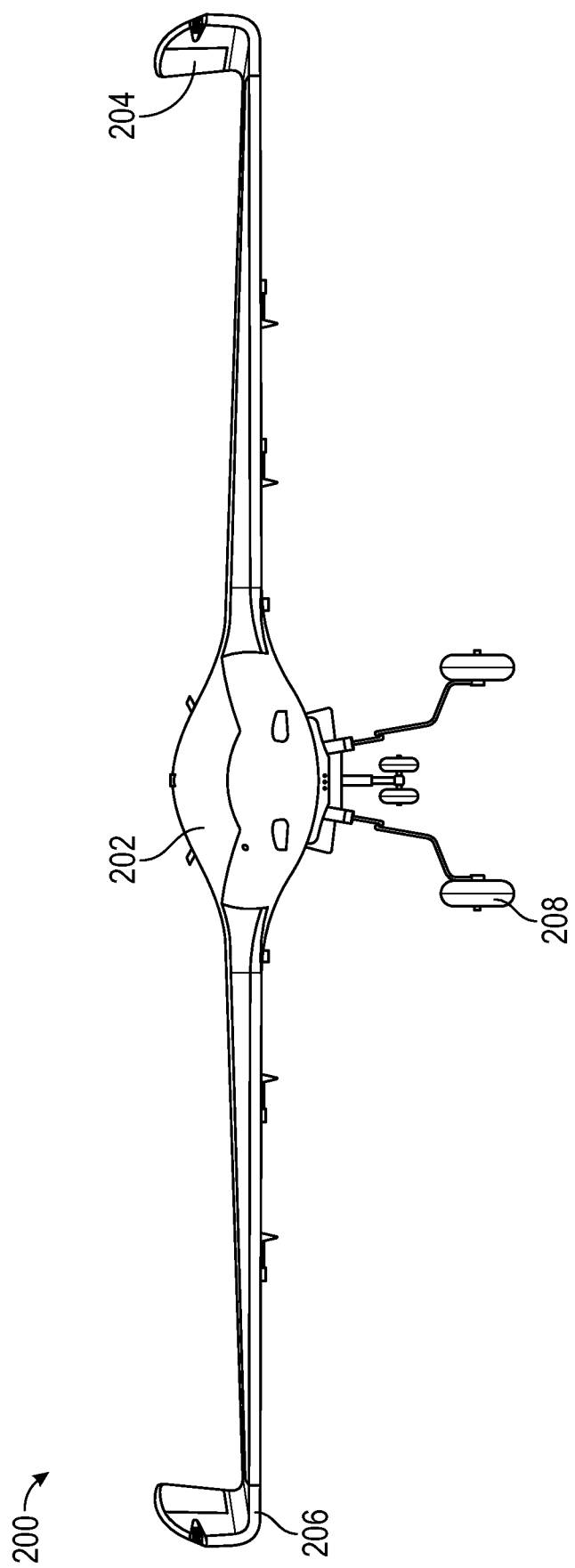
FIG. 2 illustrates a front view mono-wing drone with winglets in accordance with embodiments of the invention.

FIG. 2 further illustrates a frontal view of a mono-wing aircraft in accordance with various embodiments. It can be seen the overall structure of the aircraft 200 has a mon-wing design where the fuselage 202 is centrally positioned on the aircraft 200 and configurable winglets 204 are positioned at the end of each wing tip 206. In various embodiments, the aircraft 200 can be configured with landing gear 208 that is positioned beneath the fuselage. Although the landing gear 208 is positioned beneath the fuselage 202, it can be appreciated that some embodiments may place landing gear 208 in other locations that may be suitable for flight. Landing gear and more specific configurations will be further illustrated in other figures.

Figure 3:
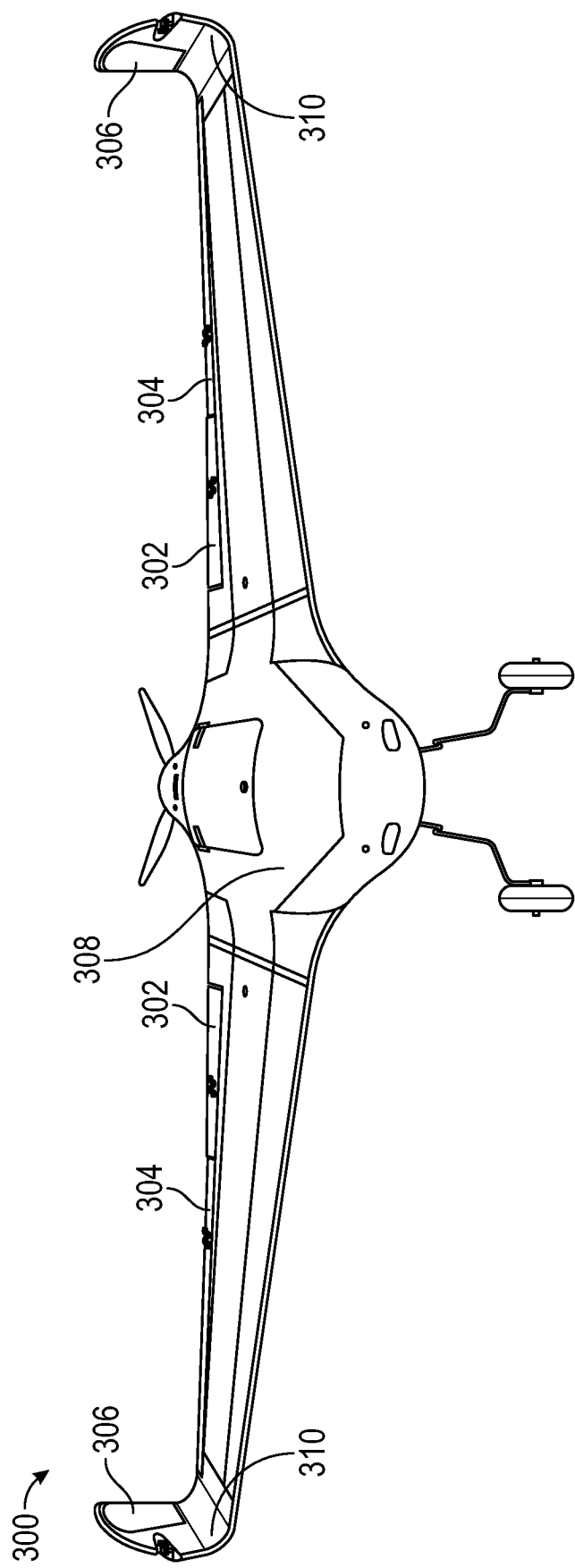
FIG. 3 illustrates an isometric view of a mono-wing drone in accordance with embodiments of the invention.
Figure 4A:
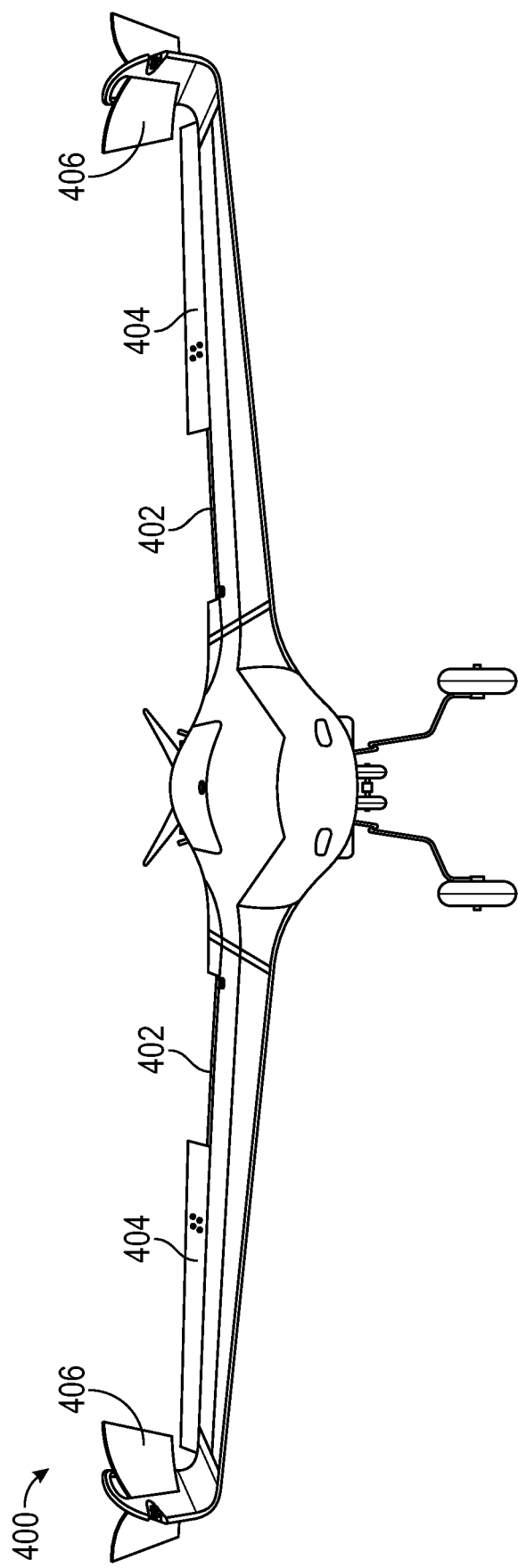
FIGS. 4A through 4E illustrate a mono-wing drone with various control surfaces in accordance with embodiments of the invention.
Figure 4B:
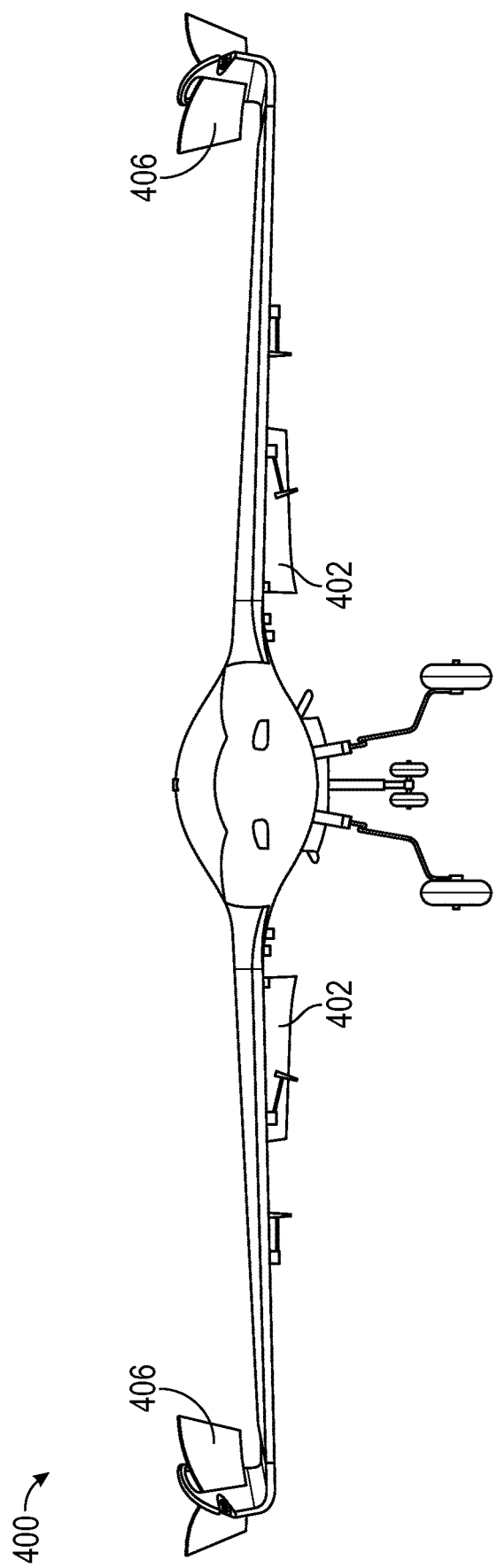
Figure 4C:
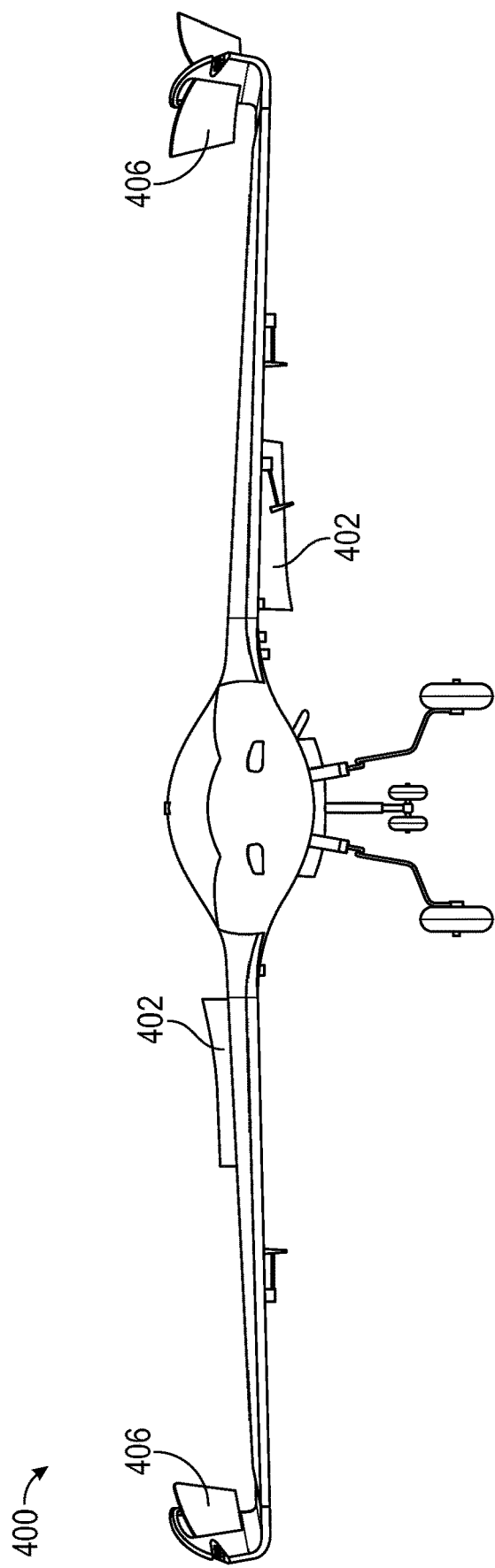
Figure 4D:
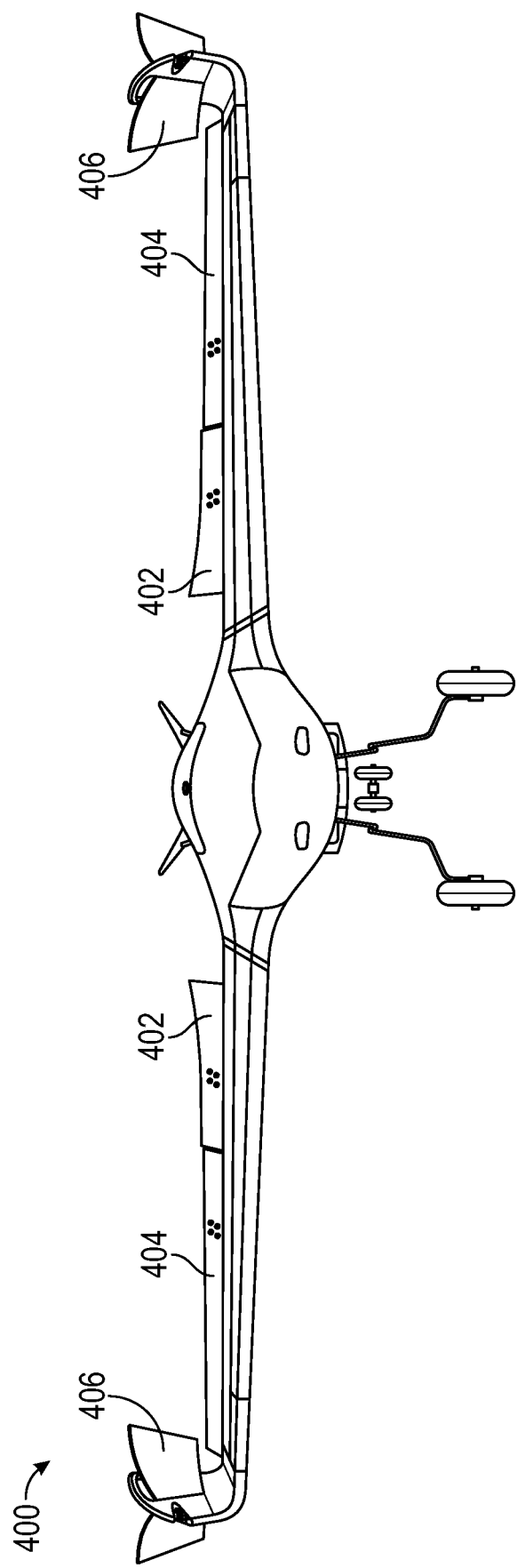
Figure 4E:
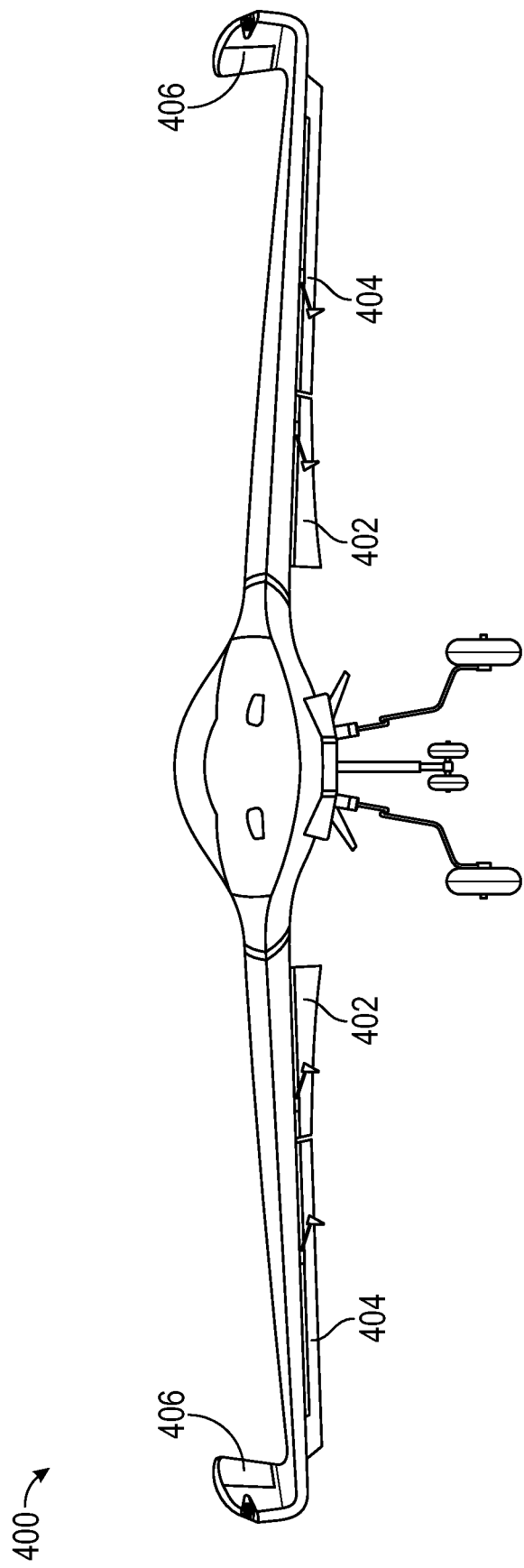
Figure 5A:
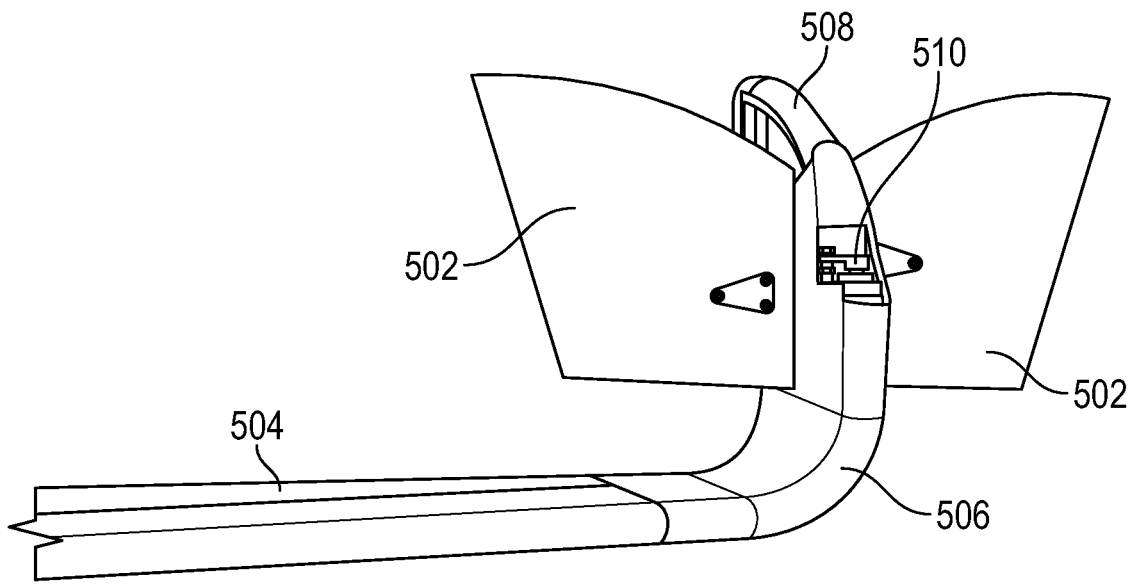
FIGS. 5A through 5D illustrate various views of a winglet in accordance with embodiments of the invention.
Figure 5B:
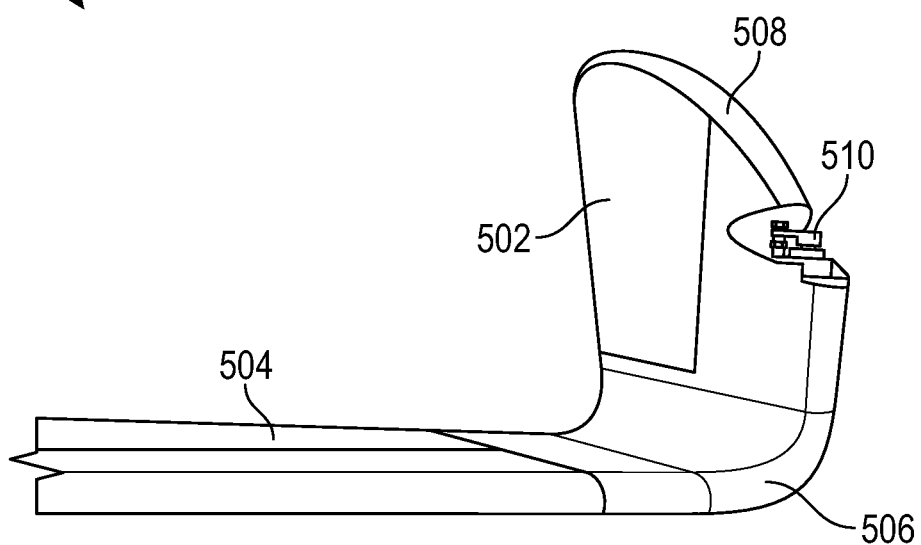
Figure 5C:
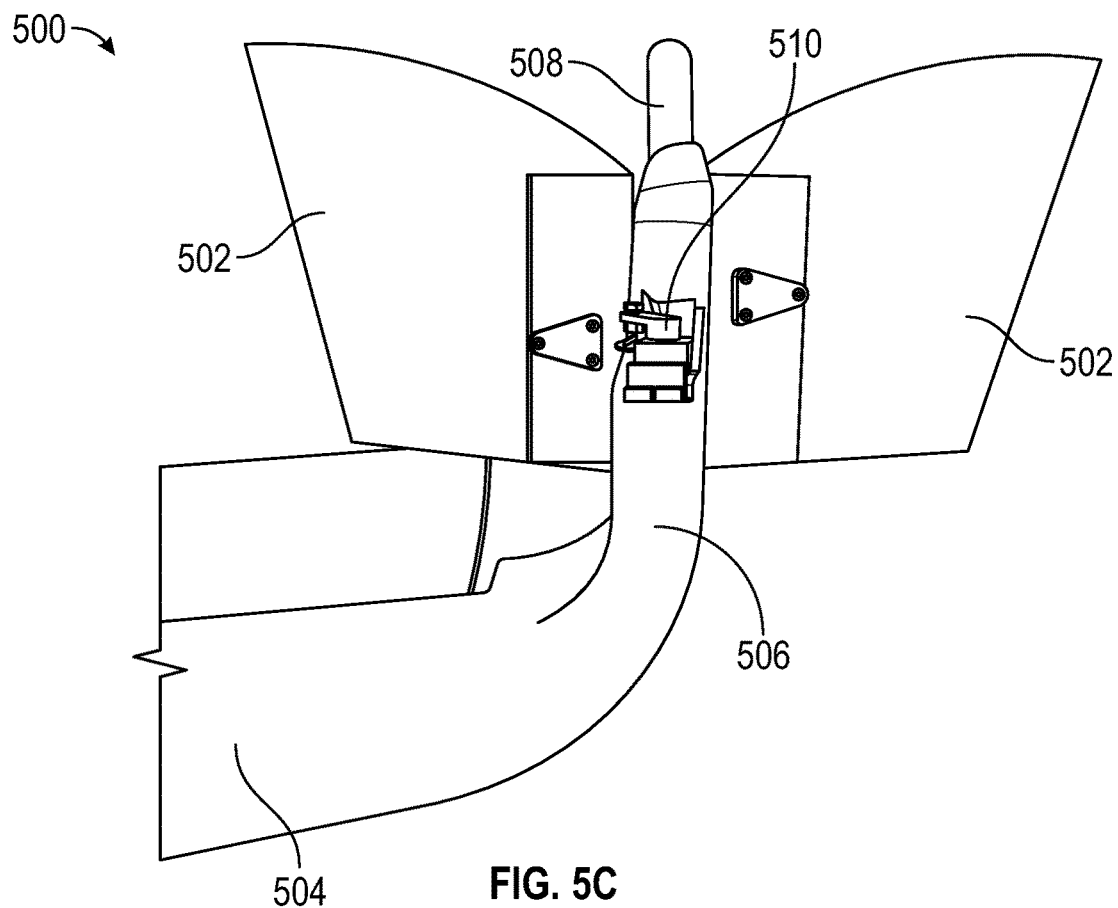
Figure 5D:
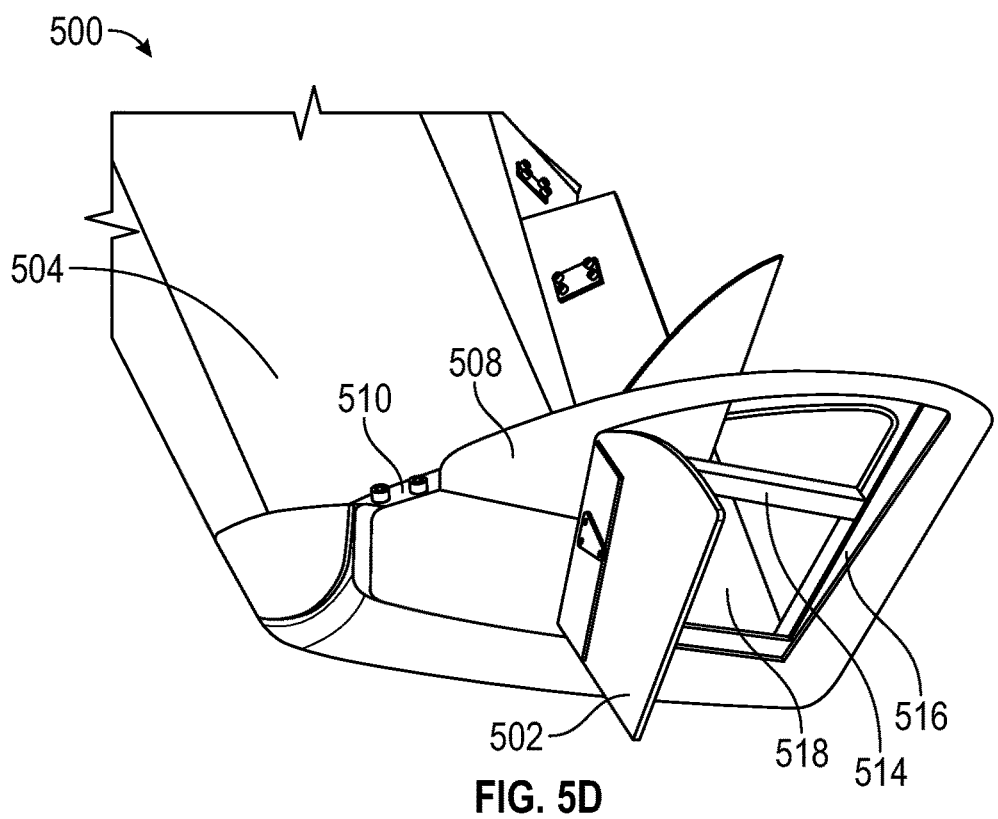

Turning now to FIG. 3 a more isometric view of a mono-wing aircraft 300 in accordance with numerous embodiments is shown. FIG. 3 further illustrates a mono-wing aircraft 300 with a number of different control surfaces (302, 304, & 306). Some of the control surfaces can be located on an aft portion of the wings 308. Having control surfaces (302 & 304) on the aft portion of the aircraft 300 can allow for controlled flight in a number of different scenarios. Although control surfaces on an aft section of a wing is not new, the traditional configuration of control surfaces on a mono-wing aircraft can have negative effects on the aircraft's ability to maintain lift during flight maneuvers. For example, traditional designs typically place smaller flaps or ailerons near the outer edge of the wing and a larger flap or inboard flap towards the inner portion of the wing closer to the fuselage. However, many embodiments of a mono-wing aircraft are configured with a smaller flap or aileron 302 that is located closest to a fuselage 308 of the aircraft. While other elevators 304 are positioned closer to the outer portion of the wings 308. This is a counterintuitive design configuration, however, allows for the aircraft 300 to maintain lift and flight control during flight given the unique design of a mono-wing with winglets 310. In numerous embodiments the wings 308 can be configured with winglets 310 that have associated control surfaces 306 integrated within the winglets 310. It can be appreciated that the movement of the control surfaces in both the aft portion of the wings well as the winglets can be used to maneuver the aircraft 300 during flight. For example, the flaps and ailerons on the rear surface of the aircraft 300 can help to control the lift of the vehicle and the winglet control surfaces 306 can help control the yaw of the vehicle as well.

For example, FIGS. 4A through 4E illustrate an aircraft 400 with control surfaces (402-406) that can be manipulated in a number of different positions to control or manipulate the movement of the aircraft. The flaps 402 and 404 can be positioned up or down in any variety of combinations between the various flaps to increase drag in certain areas and thus maneuver the aircraft. Additionally, many embodiments many include one or more winglet control surfaces or winglet rudders 406 that can likewise be moved or open and closed to help control the vehicle. For example, when the winglets rudders 406 are open (4A-4D) they can create drag and can adjust or modify the yaw of the vehicle. Additionally, they can be used to slow the movement of the vehicle. As can be appreciated, the winglet rudders 406 can have any number of configurations between fully opened (4A-4D) and fully closed (4E) as well as anywhere in between.

Embodiments of Winglet Control Surfaces

FIGS. 5A through 5D illustrate winglets 500 with integrated rudders 502 that can be positioned at the edge of the wing surface 504. In many embodiments the integrated winglet rudders 502 can be configured to be housed within the structure of the winglet 506 such that when in a closed position (5B) the rudders 502 are substantially flush with the surface of the winglet housing 508. In some embodiments, the winglet rudders 502 can be activated or controlled with a control motor 510 that can be positioned within the winglet housing 508. The control motor 510 can be a servo motor or any other motor that can allow for sufficient control of the positioning of the rudders 502. Various embodiments may have multiple motors or control mechanisms that can be individually connected to each of the rudders 502 such that the can be open and/or closed individually, thus improving flight control and maneuverability. Furthermore, the movement of the rudders 502 can be done in conjunction with the movement of the elevators 512 and/or ailerons (not shown) positioned on the wing.

In a number of different embodiments, the winglet housings 508 can have one or more structural and/or functional surfaces and components within the housing to help support the rudders 502. In some embodiments, the housing 508 may have a cross member 514 that can provide support the rudders when in a closed position. Additionally, the cross member can be configured to house one or more functional elements to help move the rudders 502. For example, the cross member may be designed as a channel in which one or more connection rods (not shown) can move. The connection rods can be connected to the rudders 502 and the control motors or control mechanism 510 to move the rudders between different stages of operation. As can be appreciated the control mechanisms 510 in conjunction with additional functional and structural elements can allow the rudders 502 to be moved in varying angles or positions that can include fully open or fully closed and anywhere therebetween. Other embodiments of the winglet housing 508 may have other surfaces 516 located within an opening 518 for the rudders 502 that act to provide support for the rudders when in a closed position. Similarly, the other surfaces 516 can be used to support any element necessary that can be used in the movement of the rudders 502.

Figure 6A:
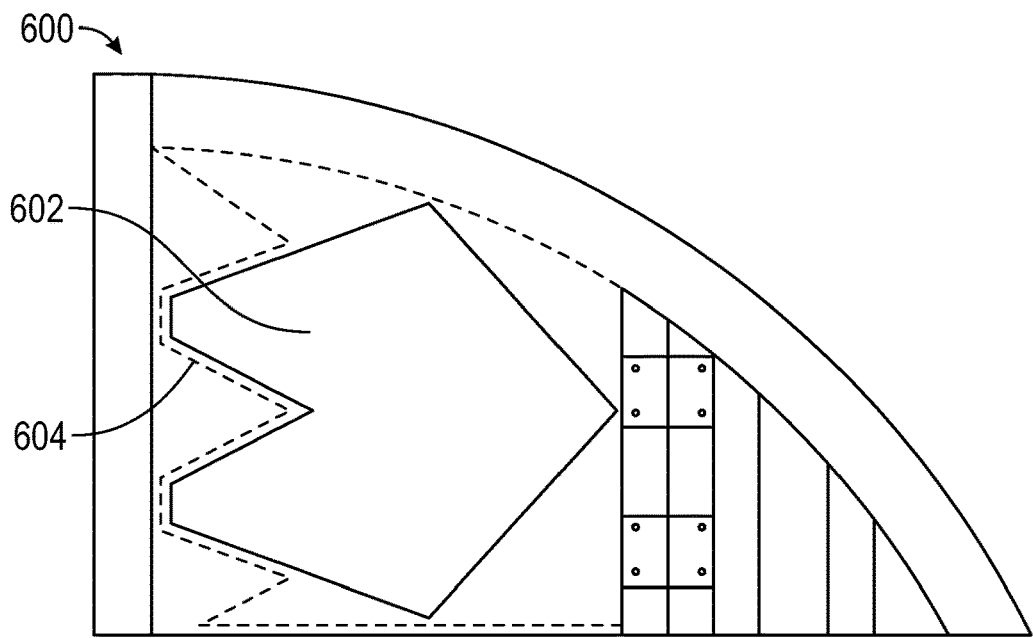
FIGS. 6A and 6B illustrates a winglet in accordance with embodiments of the invention.
Figure 6B:
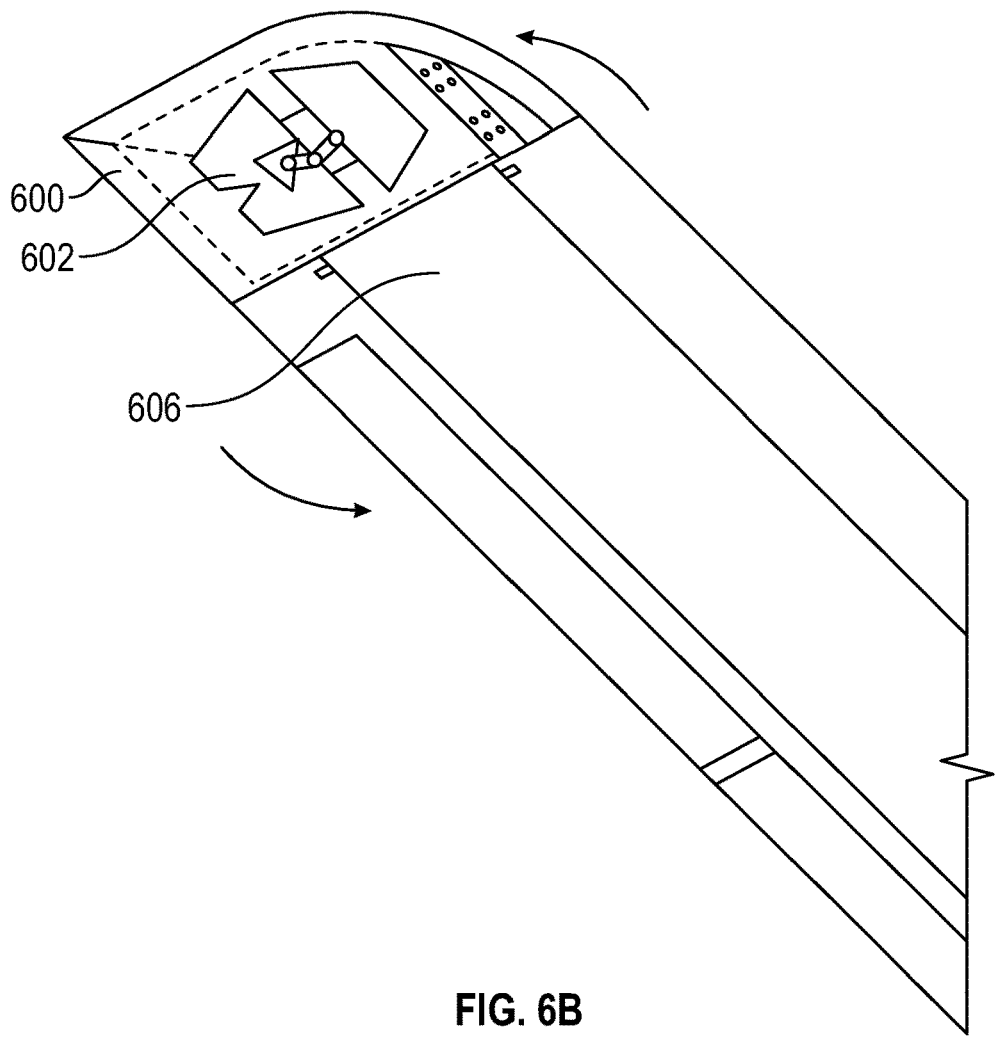

Although, certain configurations and designs of winglet rudders are illustrated, it should be understood that any number of designs can be implemented. For example, some winglet rudders may have a generally rectangular shape that can produce certain drag forces on the wings that are substantially different than contoured winglet rudders. Numerous embodiments can configure the winglet rudders to produce whatever desired drag effect on the wings as may be required for the particular purpose of the drone. For example, FIG. 6A illustrates an embodiment of a winglet 600 with a rudder 602 that has a sectioned staggered tooth edge 604. The staggered tooth edge can help to reduce the amount of surface area that interacts with the high-speed air during flight. Inherently, reducing the surface area can reduce the force needed to break the suction of pressure variance (inside vs. outside) the winglet 600. As pressure equalizes turbulent air will help to open the doors further and the opening mechanism (not shown) can transition from primarily pushing to both pushing and pulling the rudders 602 to help maintain the position of the rudder 602. Once fully open, the mechanism can remove the load from the motor (not shown) entirely. FIG. 6B illustrates an embodiment of the winglet 600 and winglet rudder 602 positioned at the end of a wing structure 606. The winglet rudder 602 is configured with an alternate tooth trailing edge 604 in accordance with some embodiments.

Embodiments of Control Mechanisms

Figure 7A:
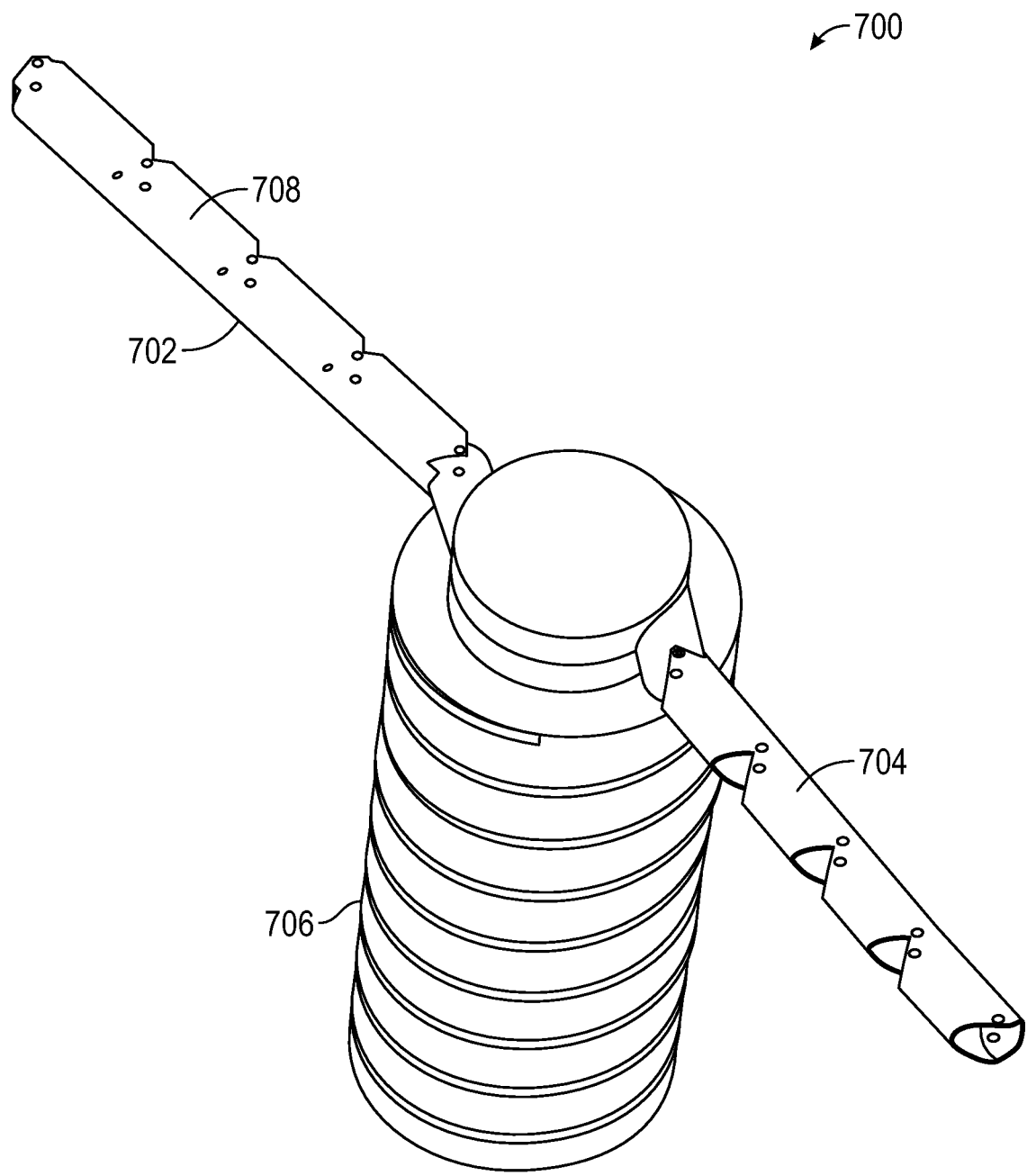
FIGS. 7A and 7B illustrate a winglet rudder control mechanism in accordance with embodiments of the invention.
Figure 7B:
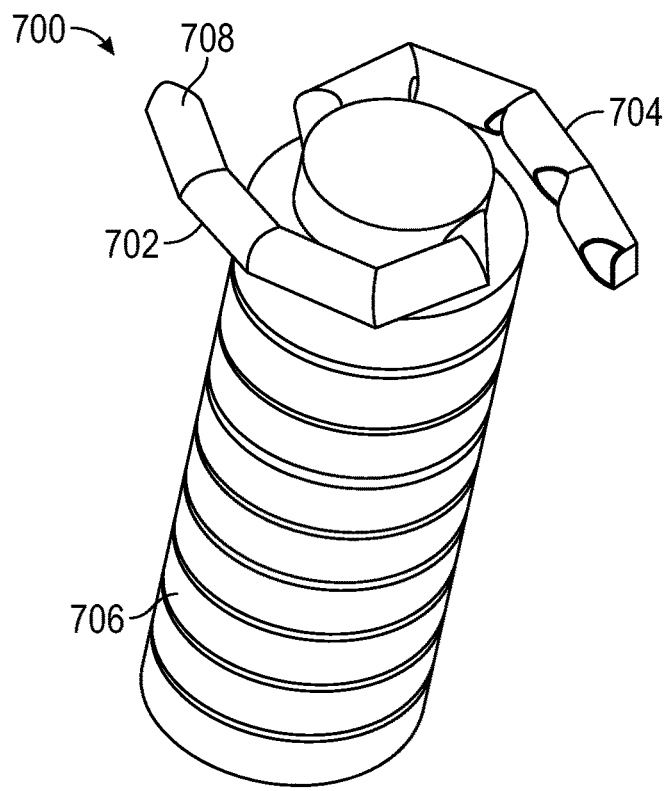
Figure 8:
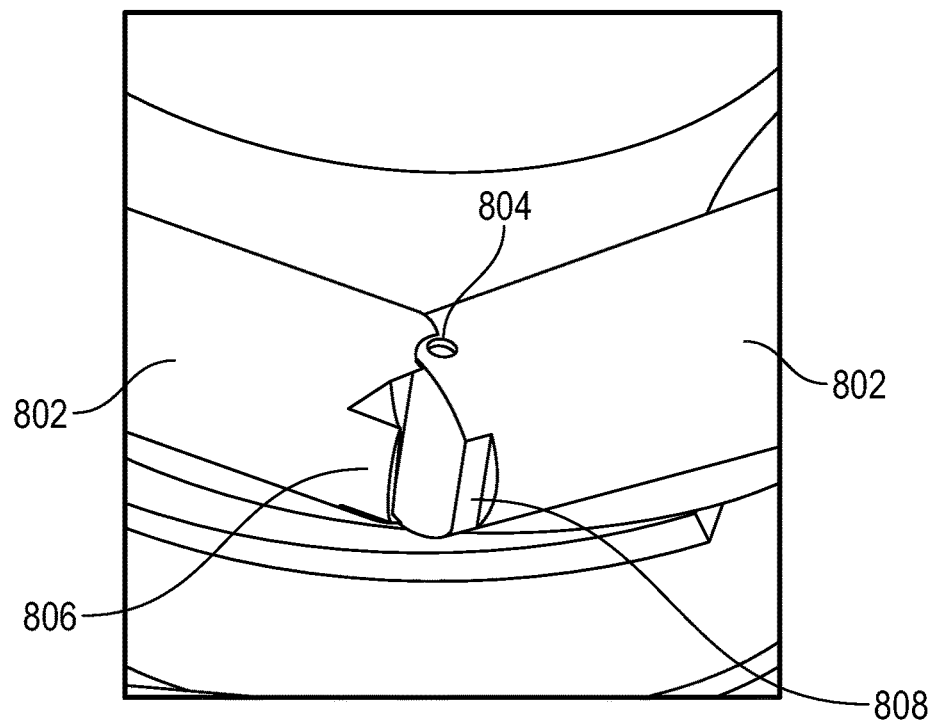
FIG. 8 illustrates interlocking segments of a rudder control mechanism in accordance with embodiments of the invention.

As has been illustrated, the movement of the control surfaces can take on any number of different forms or configurations. Accordingly, it can be appreciated that the control mechanisms used to operate the winglet rudders can be done in a number of ways. For example, FIGS. 7A through 8 illustrate an embodiment of a control mechanism and various components that can be used in conjunction with other mechanisms to actuate the winglet rudders. For example, FIGS. 7A and 7B illustrate an actuator 700 with actuator arms 702 and 704. In accordance with some embodiments or an actuator 700, the arms (702 & 704) can be moved into position by the rotation of the cylindrical body 706. Additionally, the rotation of cylindrical body 706 can allow for the subsequent rotation of the actuator arms 702 and 704 around a portion of the cylindrical body 706 such that they can be stored. The movement or rotation of the actuator arms 702 and 704 can effectively function to move the rudders between multiple positions rather than just open and closed. As illustrated, the actuator arms 702 and 704 can be formed of a number of different segments 708 interconnected at the ends and allow the segments to move with respect to one and other. Additionally, the segments can form chain like structure that is rotatably connected to the cylindrical body. As can be appreciated the rotation of the actuator can be done by any number of motors such as servo motors or more traditional rotational motor elements. Additionally, in some embodiments the cylindrical body 706 can be the motor itself or may serve as the housing for the motor. FIG. 7B illustrates the actuator arms rotated around the upper portion of the cylindrical body 706.

FIG. 8 illustrates a connection section 800 between two individual segments 802 that can be interconnected to form an actuator arm as illustrated in FIGS. 7A and 7B. The segments 802 can be interconnected at a connection point or hinge 804 that allows for the segments 802 to rotate with respect to each other. Additionally, many segments may have interlocking surfaces or interfaces 806 and 808. In accordance with numerous embodiments, the segments can be rotated such that the interlocking surfaces (806 and 808) respectively engage with each other and allow a plurality of segments 802 to form a rigid actuation arm as illustrated in FIG. 7A. Likewise, the rotation of the cylindrical body can disengage the interlocked segments and allow for the segments to wrap or rotate around the body or another connected central element. Although certain configurations of segments 802 and other components are illustrated, it should be appreciated that any configuration of elements can be used and/or omitted as required by the individual design and desired functionality of the aircraft.

Figure 9:
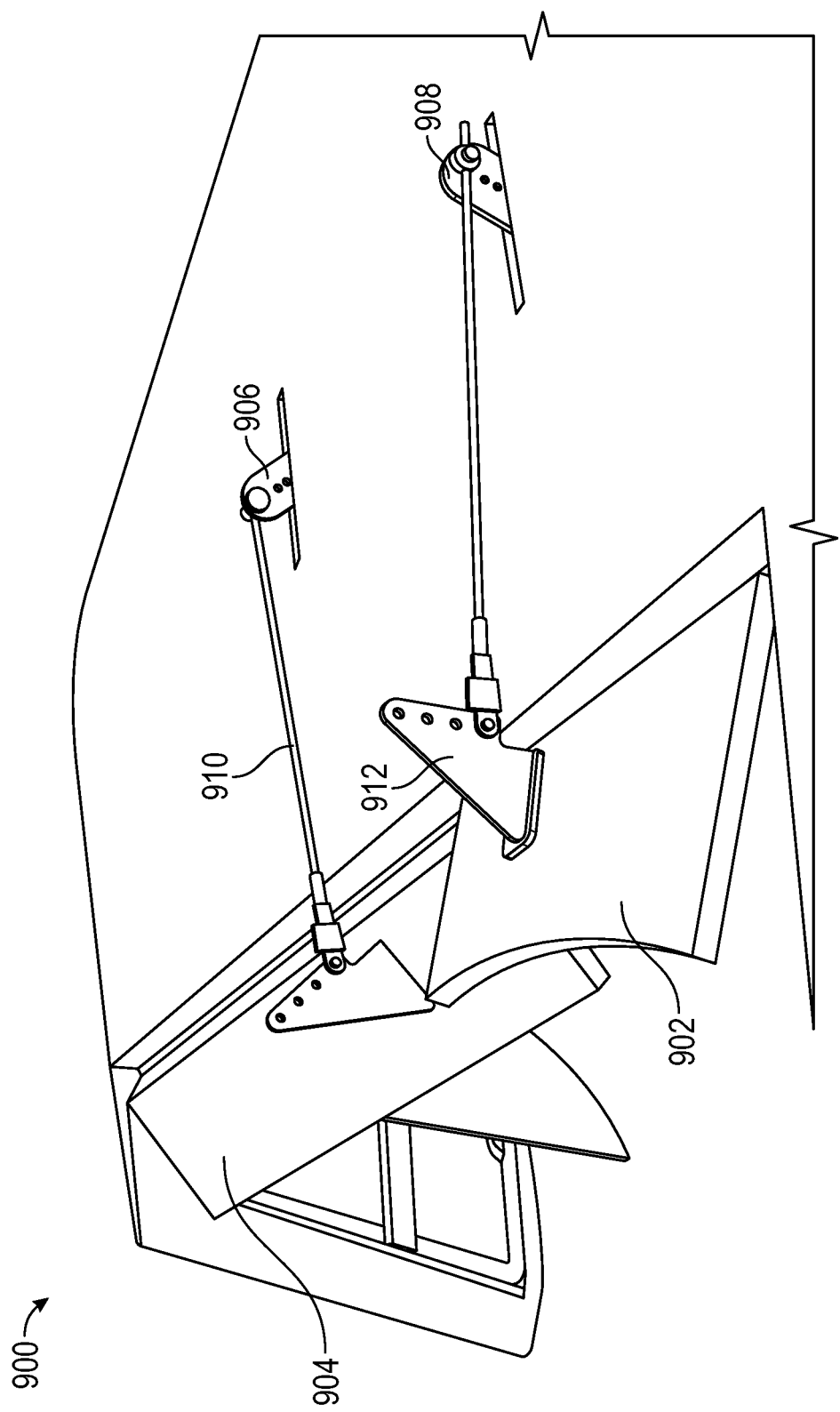
FIG. 9 illustrates elevator actuation components in accordance with embodiments of the invention.

As discussed above, aircraft are subject to a number of different aerodynamic forces. Those forces can be manipulated with the movement of the control surfaces to help control the aircraft. Accordingly, it can be appreciated that the movement of the various control surfaces can be done in a number of different ways. As previously mentioned the winglet rudders can be controlled with control motors or other control mechanisms such as rotational control arms shown in FIGS. 7A through 8. As can be appreciated, the elevators and ailerons can also be controlled with various control mechanisms. For example, FIG. 9 illustrates an under side of a wing portion 900 showing one aileron 902 and one elevator 904. Each of the aileron 902 and the elevator 904 can have their own individual control mechanism 906 and 908 respectively. In some embodiments, the control mechanism (906 and 908) may be a motor (not shown) and corresponding linkages 910 that connect to a portion of the respective control surface. In some embodiments, the control surface (902 and 904) may have a tab 912 or other component fixed to a portion of the control surface (902 and 904) that is connected to the linkage elements 910. Therefore, the movement of the motor (not shown) can translate to the movement of the control surface. Although a specific configuration is illustrated, it should be understood that a number of configurations and/or components can be used to control the movement of the ailerons 902 and/or the elevators 904.

As can be appreciated, the control surfaces can have a number of different effects on the aircraft that affect maneuverability. Additionally the drag effects can produce a number of different forces on the vehicle frame work. For example, winglet rudders, in accordance with many embodiments, can produce twisting moments on the wings themselves that can affect how the wings and other control surfaces generate lift and/or drag. Although not shown, some embodiments can incorporate additional structural components or supports within the wings and/or fuselage to provide additional stiffness to the wings and other structures. For example, some embodiments may use carbon reinforced skeletal components to add stiffness to the wings. Other embodiments may use metal or any other suitable material to provide additional stiffness. Additionally, some embodiments may account for additional twist and/or movement of the wings in the control systems that may be implemented. These designs and/or elements can be tailored to the specific function of the aircraft. For example, some embodiments may be configured to carry a load or cargo and would require different structural configurations from that of an aircraft that only carries a camera for example.

It should be readily appreciated that any type of material can likewise be used for the overall structure of the aircraft. For example, some embodiments may use carbon reinforced wings and fuselage or carbon overlays. Other embodiments may use plastic, any lightweight metal, or foam for the main structure. Additionally, some embodiments can use additive manufacturing techniques to build the main structure with the stiffeners built into the additive manufacturing process such that the entire aircraft is built in one continuous process.

Embodiments of Landing Gear

Figure 10A:
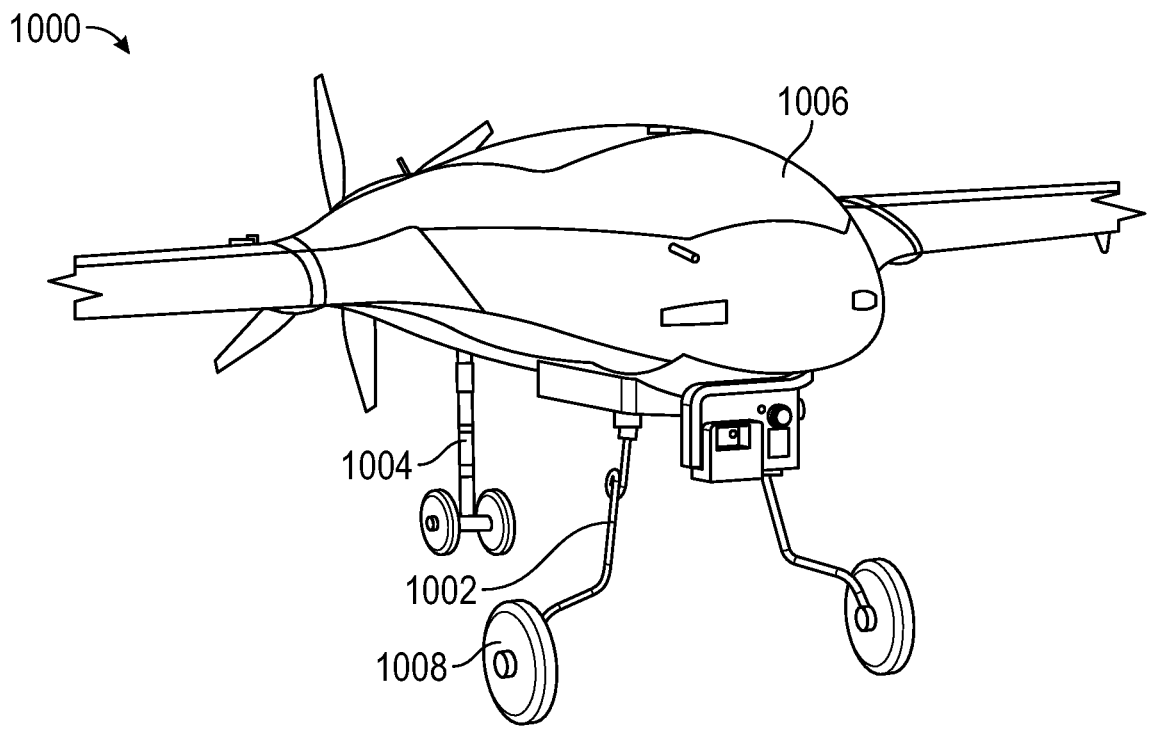
FIGS. 10A through 10F illustrates landing gear of an aircraft in accordance with embodiments of the invention.
Figure 10B:
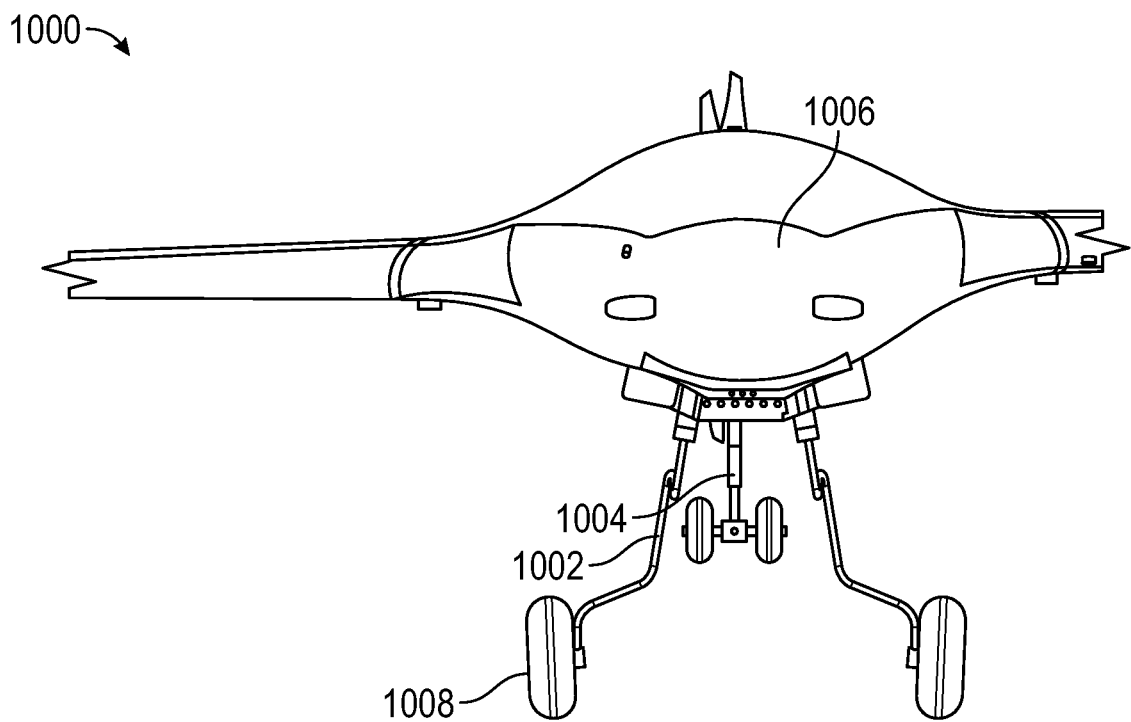
Figure 10C:
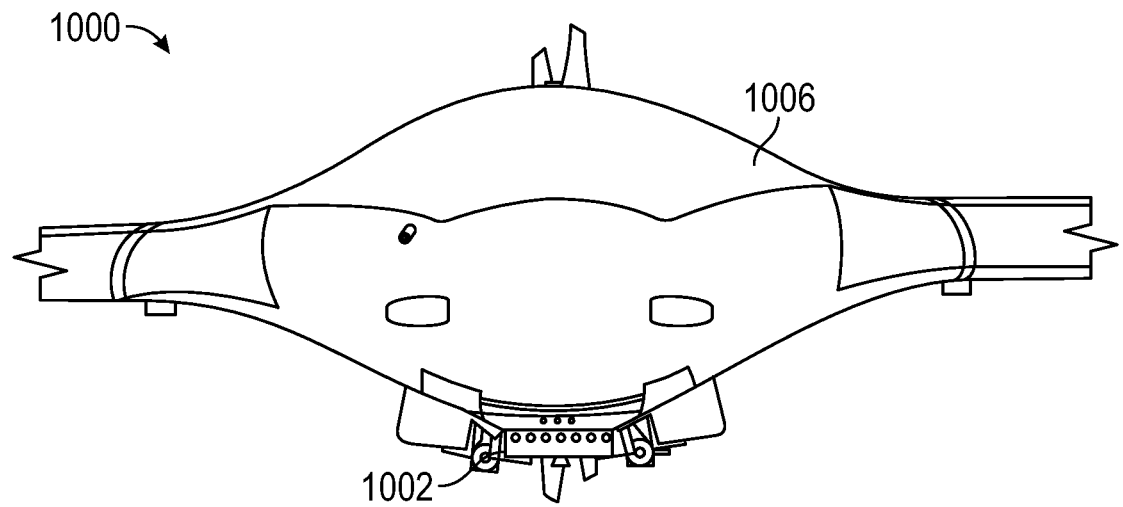
Figure 10D:
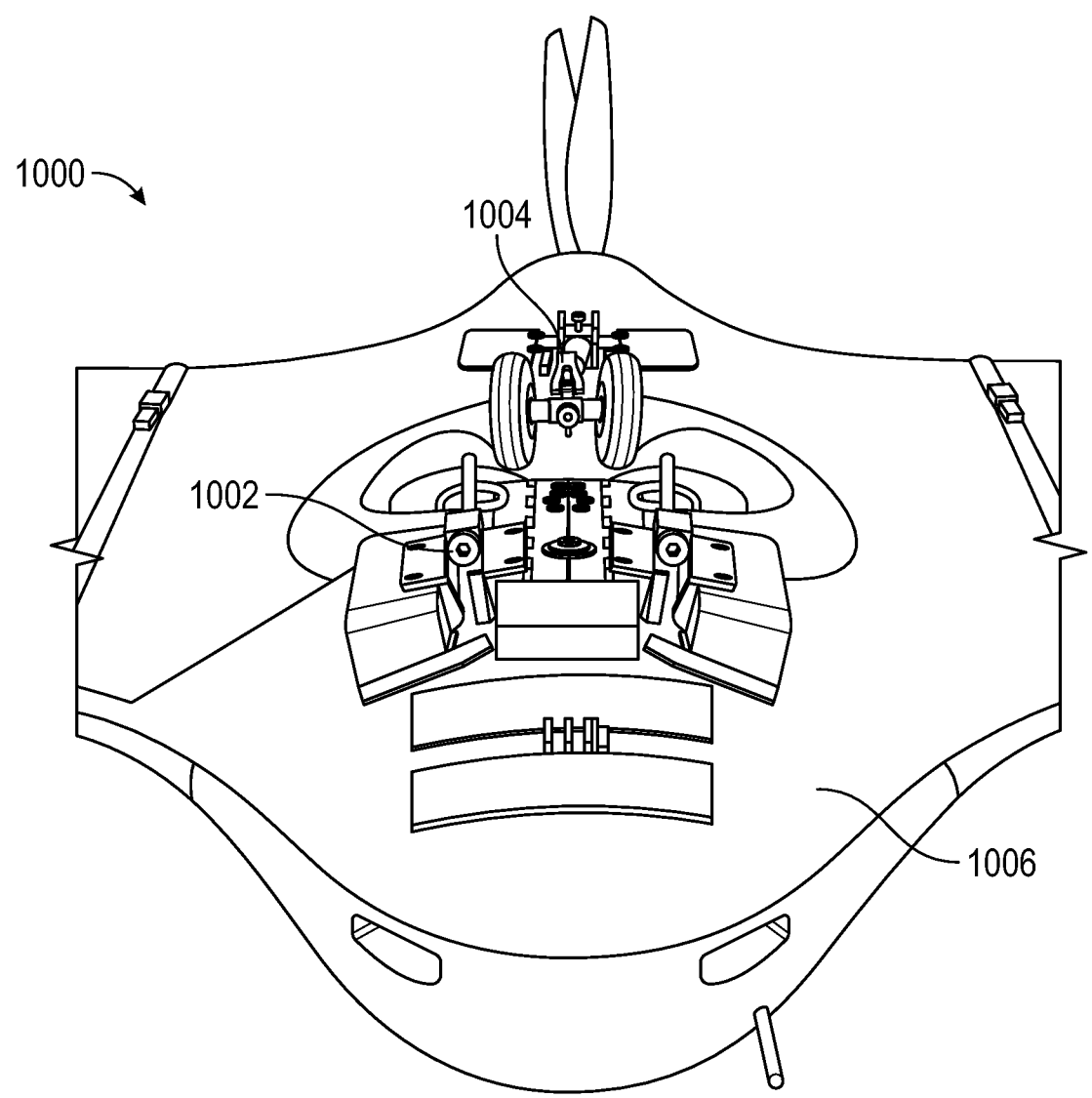
Figure 10E:
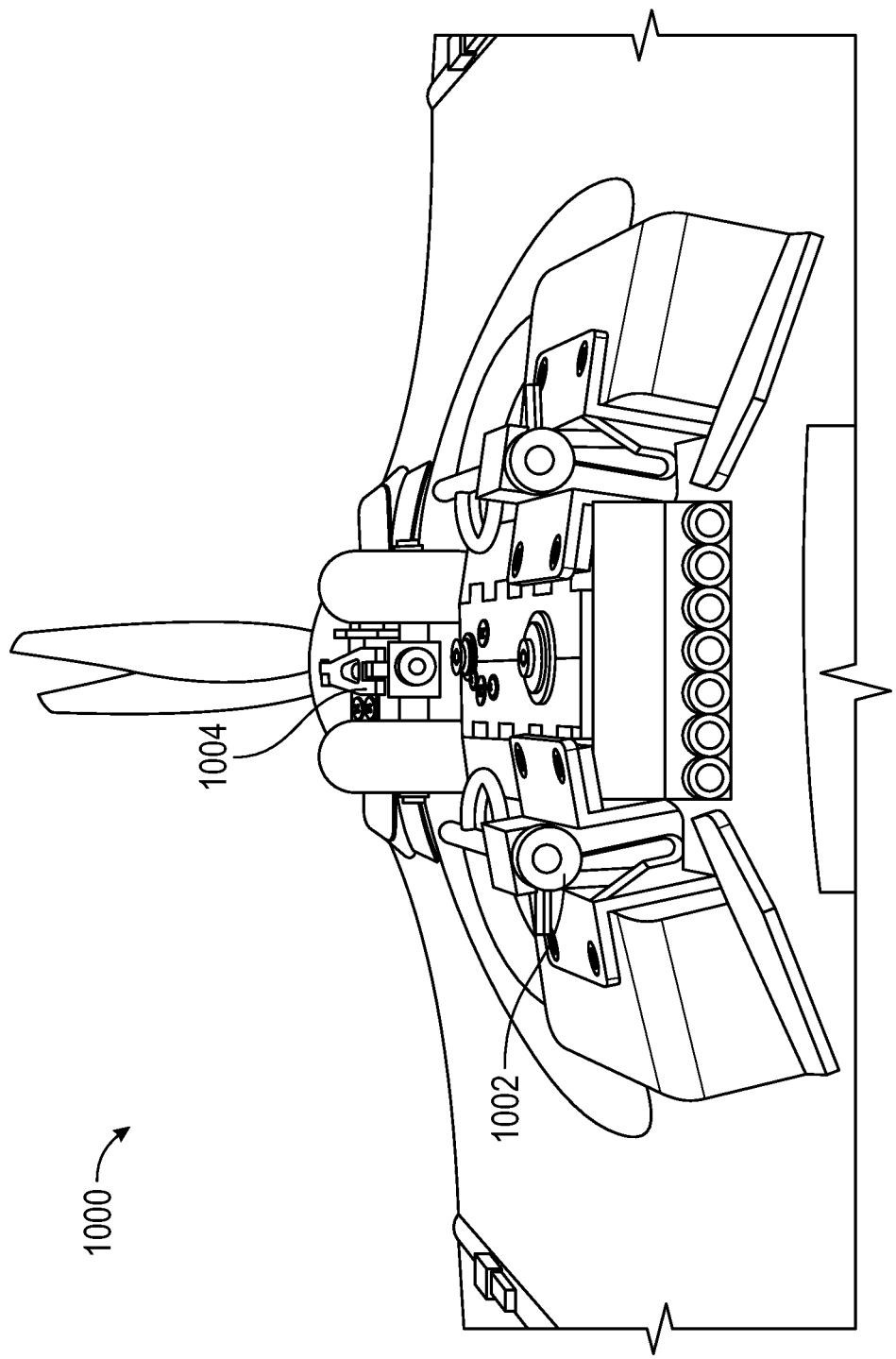
Figure 10F:
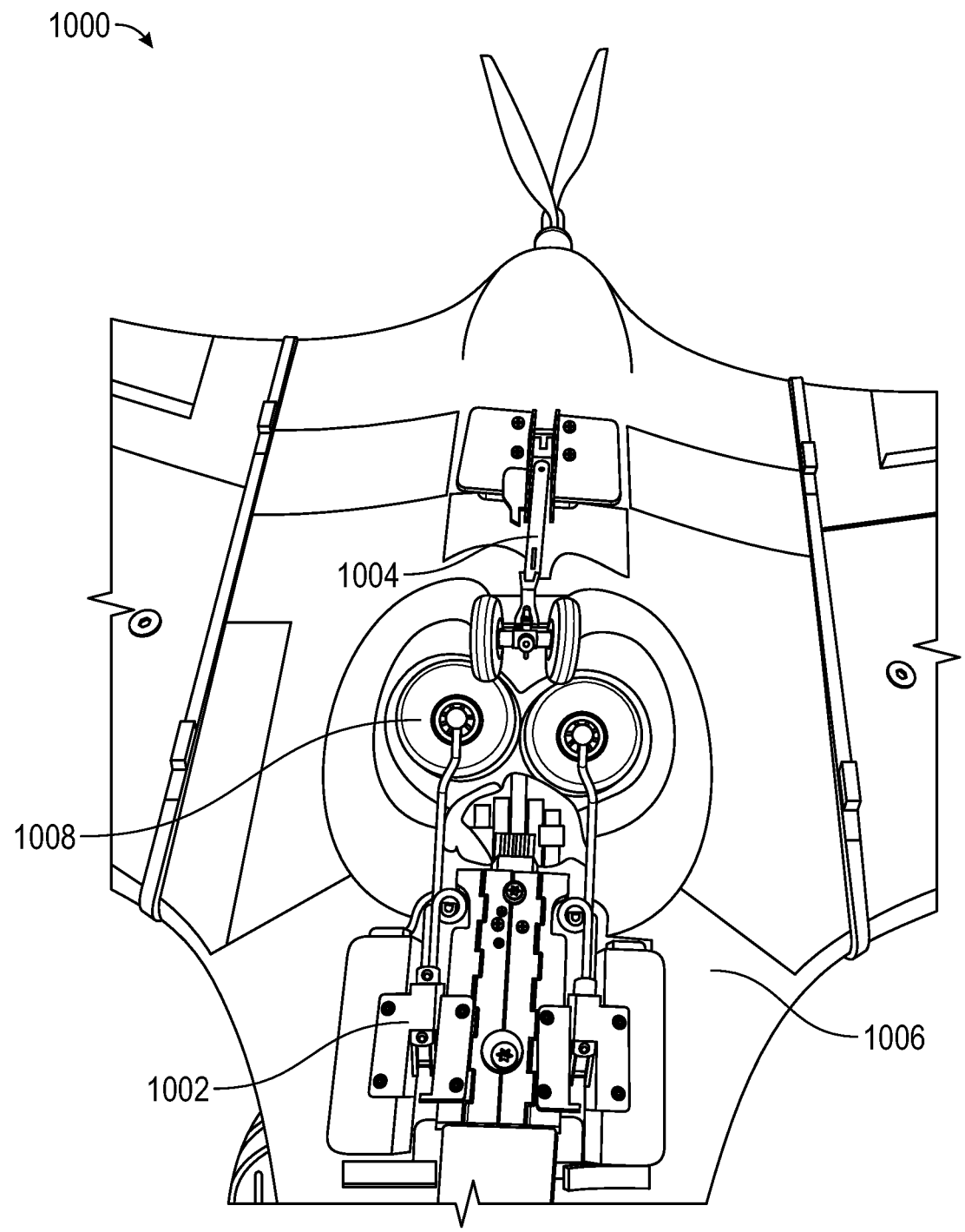

Many full scale and some smaller scale aircraft incorporate landing gear to allow the aircraft to land in a variety of different situations. As can be appreciated the landing gear can take on any number of forms and/or configurations that may be suitable for the respective function of the aircraft. For example, FIGS. 10A through 12 illustrate landing gear incorporated into an aircraft in accordance with various embodiments. FIG. 10A illustrates an isometric view of an aircraft 1000 with forward 1002 and rear 1004 landing gear arrangements. In various embodiments, the landing gear (1002 and 1004) can be configured to fold or rotate up into or close to the main body of the aircraft. FIGS. 10A and 10B illustrate the landing gear (1002 and 1004) in a deployed position while FIGS. 10C through 10F illustrate the landing gear (1002 and 1004) in a stored position. In a number of embodiments, the stored position of the landing gear can position portions of the landing gear within at least a portion of the fuselage 1006. For example, it can be seen in FIG. 10F the wheels 1008 are stored within a cavity of the fuselage. This can help to reduce the potential drag that may be created by landing gear (1002 and 1004) that protrudes beyond the external surfaces of the aircraft.

It can be appreciated that the use of landing gear can affect the aerodynamics of any aircraft and therefore respective designs of the aircraft and control surfaces must consider the potential effects of the landing gear. For example, landing gear adds weight to the aircraft and can likewise affect the center of gravity. Therefore, the location of the landing gear, if used, should be carefully considered, especially in a mono-wing design similar to many embodiments. In numerous embodiments, it can be advantageous to position the landing gear as close to a centerline of the aircraft as possible. This can be illustrated in FIGS. 10B through 10F. A more central position can help to improve the overall functionality and controllability of the aircraft.

Figure 11:
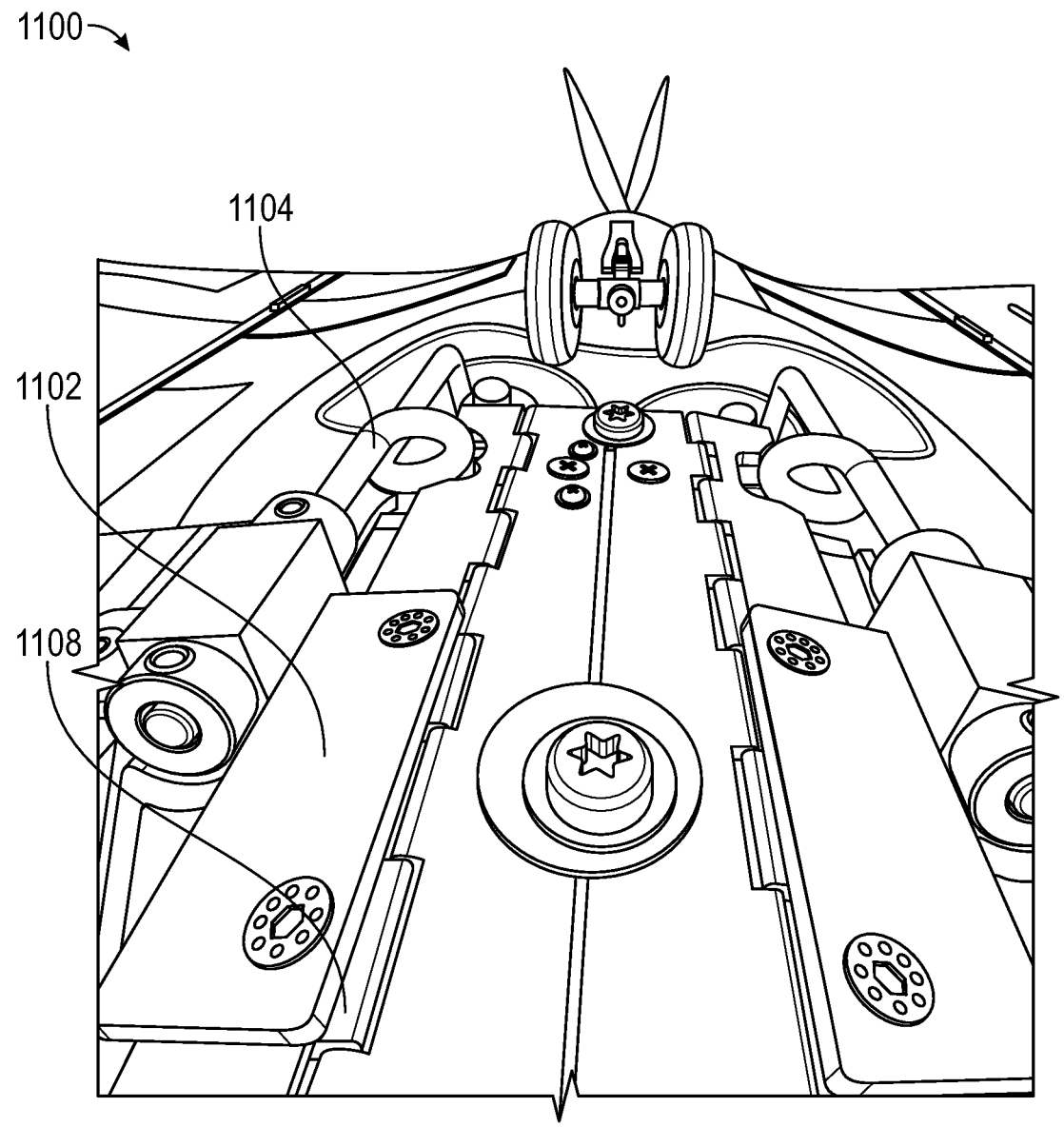
FIG. 11 illustrates components of landing gear in accordance with embodiments of the invention.
Figure 12:
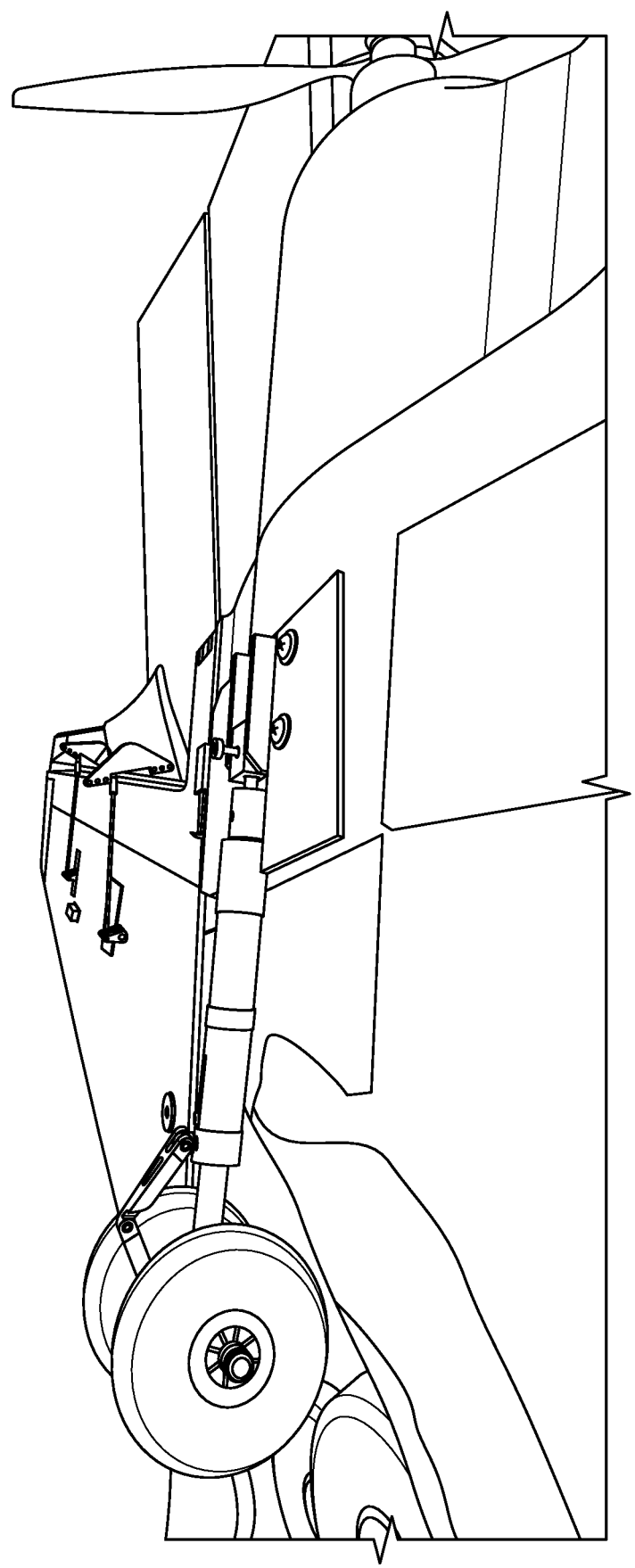
FIG. 12 illustrates rear landing gear of an aircraft in accordance with embodiments of the invention.

Since the position of the landing gear can have potential effects on the functionality of the aircraft, some embodiments of the landing gear may be designed with specific folding and shock absorbing mechanisms. For example, FIG. 11 illustrates landing gear 1100 in a stored position. The landing gear 1100 can have a number of different components that can be used to move the gear to and from a stored position. Understandably, some embodiments of the landing gear 1100 may have one or more hinged elements 1102 connected to a strut 1104 that is configured to support the wheels 1106. Additionally, given the compact nature of landing gear on a small aircraft or a mono-wing aircraft, some embodiments may incorporate suspension elements such as resilient springs or hydraulic type suspension components within the hinges 1108 of the hinged element. Other embodiments may place suspension elements on the struts 1104 such that the strut itself acts as a support as well as provides suspension to absorb the shock of landing. In a number of embodiments, the deployed position of the landing gear 1100 may allow for the hinge elements 1102 to lock to hold the struts in a downward position during landing. Some embodiments of the landing gear 1100 may incorporate separate locking or lockable mechanisms that can be used to keep the landing gear deployed when landing. FIG. 11 illustrates a rear landing gear element that can be configured on the aft portion of the aircraft. In many embodiments, the rear landing gear can be static or dynamic. When dynamic, the landing gear can be rotated between a stored and a deployed position to reduce drag on the aircraft during flight.

Embodiments of Power Supply

Small scale aircraft such as drones traditionally utilize electrical power in order to power the respective rotors and all other moving components of the aircraft. Traditional configurations often involve the use of batteries that are disposed in the housing of the aircraft and are electrically connected to the moving components by way of a controller. This is especially true for autonomous aircraft that operate without human interaction or relatively little human interaction. Likewise, many embodiments of a mono-wing aircraft can use electrical power and a combination of batteries and controllers to provide the power necessary to operate the aircraft. In a number of embodiments, the aircraft can house the batteries or power source within the fuselage or within portions of the wing. The batteries or power supply can be connected to the controller and/or the propulsion system and the control surfaces in order to operate the vehicle. Furthermore, with the ever-changing technology surrounding batteries, embodiments of the aircraft can implement any battery or other power source that might be suitable for the given design.

Despite the advancements in battery technology and control methodologies, many traditional designs still require the batteries to be charged offline, or while not in flight in order to operate the aircraft. Some designs may use solar panels that can charge the batteries during flight, however, such designs offer other complications with increased weight as well as issues with respect to nighttime flying. Various embodiments of the aircraft can be configured with intake and exhaust manifolds that may be positioned within the wing portions or the fuselage. These intake and exhaust manifolds, in accordance with numerous embodiments can have a number of different baffles geometrically configured within the manifold and positioned to interact with the airflow generated during flight. The baffles can be configured with nanotube arrays that are designed to absorb positive or negative ions from the surrounding air. In accordance with various embodiments, the positively charged ions that exist in solar wind radiation are attracted to a negatively charged array of nanotubes. Accordingly, a diode and battery can intercept and store the positive charged ions. Subsequently, the positive ions can be used to generate an electrical charge used to power the aircraft.

Figure 13A:
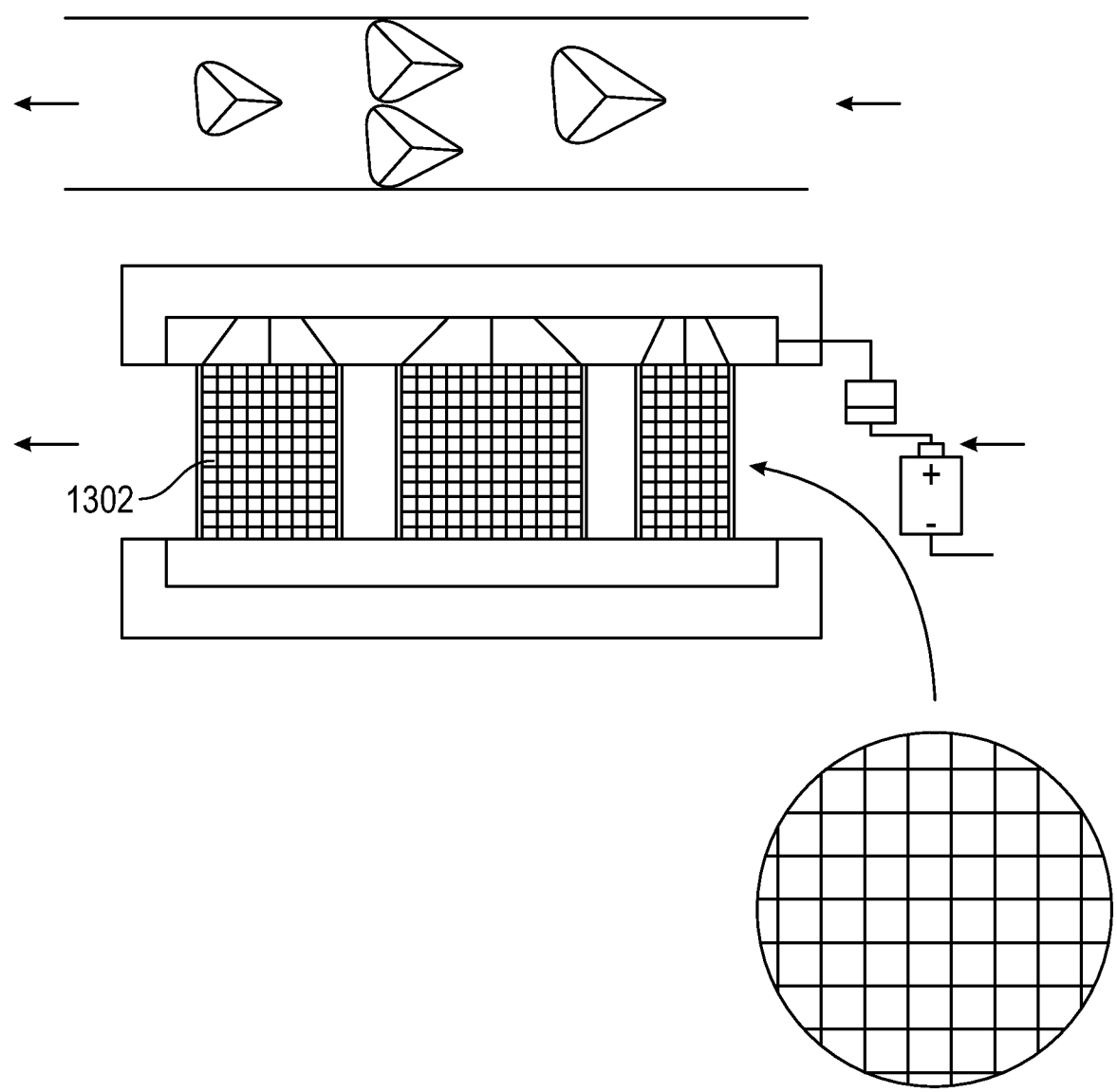
FIGS. 13A and 13B illustrate ion harvesting mechanisms in accordance with embodiments of the invention.
Figure 13B:
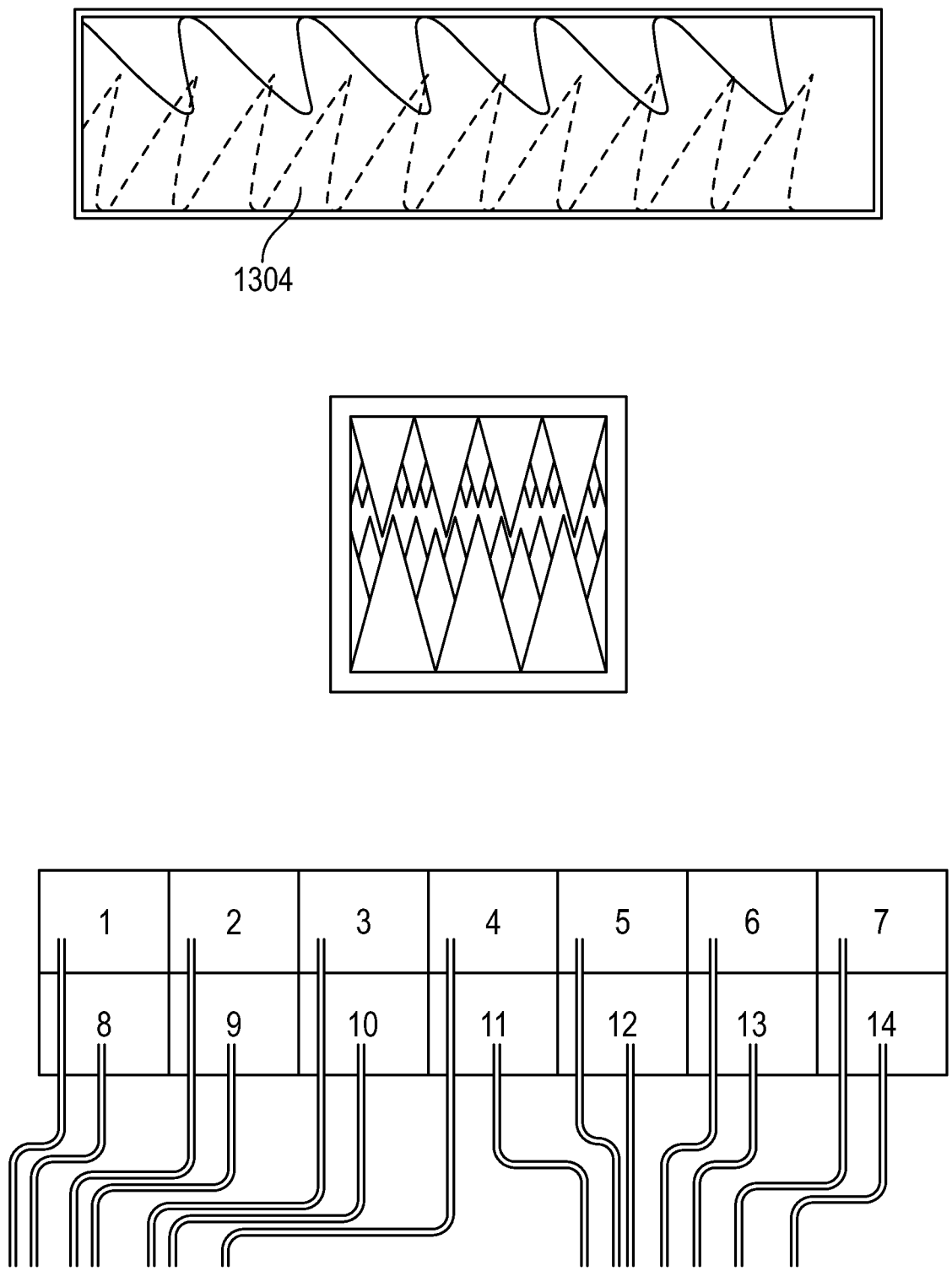

FIGS. 13A and 13B illustrate different configurations of the nanotube arrays in accordance with some embodiments. For example, FIG. 13A illustrates the nanotube wires arranged in a grid like pattern 1302 within a portion of a wing of an aircraft. Likewise, FIG. 13B illustrates the nanotube arrays configured in an alternating pattern 1304 within a manifold of an aircraft. As an aircraft is airborne, the airflow around the aircraft during flight can be directed through the manifolds and the nanotube arrays can collect the ions and transfer the energy to the batteries on board the aircraft. It can be appreciated that the continual collection of ions from the air during flight can allow the aircraft the potential for extended periods of flight as well as extend the range of the aircraft beyond the typical battery powered aircraft. In various embodiments the nanotube arrays can be structured within a portion of the wing of an aircraft similar to the stacked pattern 1306 in FIG. 13B. This can be useful in providing multiple channels from which the nanotubes can collect ions for electrical power generation. As can be appreciated, numerous embodiments can have more than one battery pack or flight pack that is independently capable of providing the power necessary for flight operations. As such, some embodiments may utilize one or more nanotube arrays that can operate to charge one flight pack while the second or other flight pack is being discharged for flight operations. In some embodiments the nanotube arrays can be configured to provide continuous charging to the flight packs to provide longer more continuous flight times.

In numerous embodiments, the nanotube arrays can be formed from carbon. Additionally, many embodiments may utilize additive manufacturing processes to adhere the nanotube arrays such that the array can be exposed to the passage of high-speed air at subzero temperatures. For example, some embodiments of the nanotube arrays may be sprayed on using an adhesion mixture while other embodiments may use a build up of multiple layers of a nanotube ink or paint like substance applied to a structure within the wing. Accordingly, the nanotube array can be designed to produce the most amount of electricity for the aircraft given the aircrafts specific function. For example, the nanotube arrays can be designed within the build of the aircraft to produce enough energy for sustained flight while carrying a payload whereas, other embodiments may not require the same amount of energy for flight and may have different design configurations. Accordingly, some embodiments may have configurable nanotube arrays that can be adjusted to produce the necessary energy for sustained flight given any circumstance. Additionally, some embodiments of the nanotube arrays may have external intake and exhaust doors in order to provide further control of charge manipulation while protecting the array and preserving aero dynamic integrity when not in use. As can be appreciated the use of nanotube arrays and the application thereof could be applied to the shielding of spacecraft manned or unmanned to provide added protection against radiation.

Embodiments of Payload devices

Although numerous embodiments have been illustrated specifically with respect to a flying vehicle, it should be understood that the applications of the vehicle can be endless. For example, some mono-wing aircraft can be configured to transport a payload in accordance with many embodiments. The payload can be placed in a number of different locations, including the fuselage or even attached to the underbelly of the aircraft. The payloads can vary and it should be understood that the vehicle can be scaled to carry any number of different payloads. For example, some embodiments may be configured to carry fire retardant or any other suitable material or substance that can be delivered by air. Additionally, many embodiments of a payload device may be configured to deliver life saving equipment such as medical equipment and GPS equipped personal flotation devices. As can be appreciated, there may be numerous embodiments of an vehicle that is capable of flying at higher altitudes than smaller traditional drones. As such, some embodiments may be capable providing a high altitude launch vehicles for things such as micro rockets for cubesat delivery.

Figure 14A:
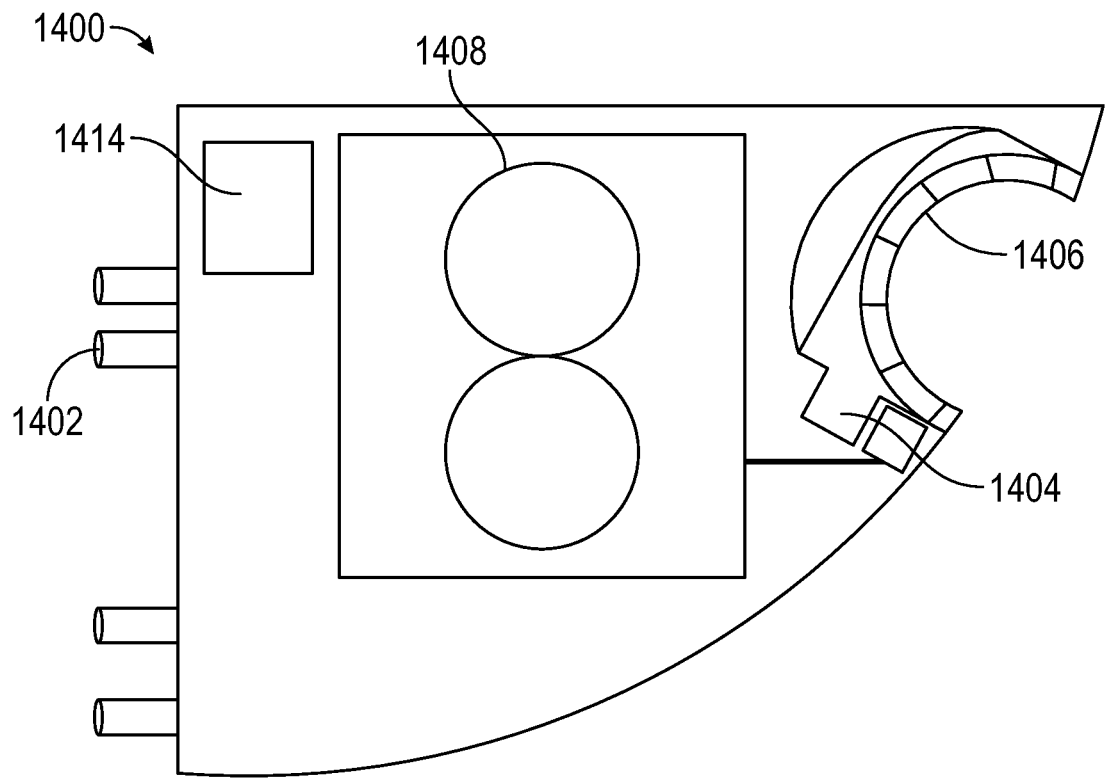
FIGS. 14A through 14C illustrate a payload delivery device in accordance with embodiments of the invention.
Figure 14B:
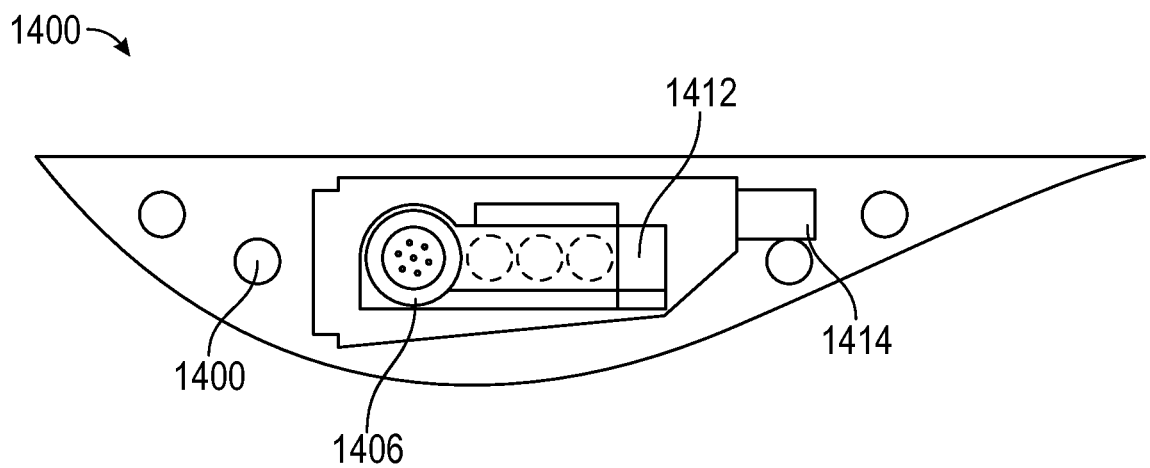
Figure 14C:
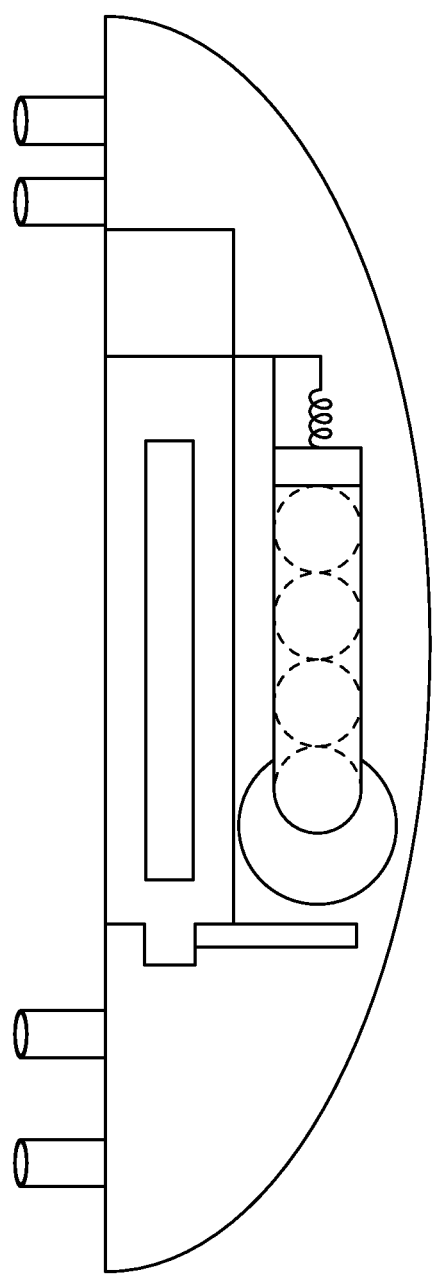

For example, FIGS. 14A through 14C illustrate an embodiment of a payload device 1400 that is configured to carry multiple payload components such as fire-retardant balls. The payload device 1400 can be configured with a number of mounting pegs 1402 that allow the device to be installed and/or removed from a portion of an aircraft. The payload device 1400 can act as an air actuated rechargeable delivery system that has a holding mechanism 1404 that secures a number of different payload elements; such as fire-retardant balls. The device 1400 can be configured with a gas system 1408 such as $CO_2$ tanks or other suitable system that can be used to eject the fire-retardant balls free and clear of the aircraft. Numerous embodiments of a payload device may also incorporate an electric motor that actuates a release mechanism in the holding mechanism and allows for the tender 1406 to spin. As can be appreciated, the tender 1406 can rotate from an open and closed position such that in the open position (14A) the payload can be released. In the closed position the tender 1406 can act as a closure to the system to prevent unwanted aerodynamic influence from the opened system. Additionally, this can be done in a controlled fashion with any number of control devices such that the release of the payload is carefully controlled.

FIG. 14B illustrates a side view of the payload device 1400 where it can be readily seen that the device 1400 can be equipped with a reloadable dispenser mechanism 1410 that can store multiple elements for delivery. In some embodiments, the device 1400 can have a pretensioner component 1412 in the dispenser mechanism that applies tension to the total payload and directs each subsequent element into the holding mechanism for subsequent delivery. This can allow for multiple deliveries over a period of time. If desired, the elements can be delivered sequentially or in some embodiments they can be delivered simultaneously. In accordance with some embodiments, the delivery device can have a separate battery component 1414 that is used to provide power to the gas system 1408 and the dispenser mechanism or tender 1406. In some embodiments, the power can be drawn directly from the aircraft and the mounting pegs 1402 can have electronic connections that connect to the electrical system of the aircraft. This can help to reduce the overall weight of the payload device 1400. FIG. 14C illustrates an alternative view of a payload device 1400 in accordance with various embodiments.

SUMMARY & DOCTRINE OF EQUIVALENTS

As can be inferred from the above discussion, the above-mentioned concepts can be implemented in a variety of arrangements in accordance with embodiments of the invention. Specifically, many embodiments include a mono-wing aircraft with winglets positioned at the outer tips of the wings, where the winglets each have configurable rudders. Additionally, many embodiments incorporate alternative methods of powering the aircraft to allow for extended flight. Achieving such functionality, according to embodiments, involves the implementation of special arrangements/designs between subsystems described above, and their equivalents.

Accordingly, although the present invention has been described in certain specific aspects, many additional modifications and variations would be apparent to those skilled in the art. It is therefore to be understood that the present invention may be practiced otherwise than specifically described. Thus, embodiments of the present invention should be considered in all respects as illustrative and not restrictive.

What is claimed is:

1. An aircraft comprising:
a fixed wing portion that has a first and a second wing tip and a front portion such that the fixed wing portion forms a substantial portion of a body of the aircraft;
at least two winglets where one of the winglets is disposed at the first wing tip and the second winglet is disposed at the second wingtip, wherein each of the winglets has a winglet body that is elongated and extends upward away from an outer surface of the fixed wing portion of the aircraft, and wherein each winglet body comprises an opening, and a cross member, the cross member extending from a front most edge of the opening to a rear most edge of the opening,
wherein each of the at least two winglets are configured with at least two rudders that are individually movably connected to the winglet body and have at least a stored position and at least one deployed position,
wherein the stored position places each of the two rudders substantially flat against the winglet body such that the cross-member is positioned between the rudders, and
wherein the deployed position places each of the two rudders substantially away from the winglet body.

2. The aircraft of claim 1, further comprising more than one deployed position.

3. The aircraft of claim 1, wherein at the at least two rudders have a rectangular shape.

4. The aircraft of claim 1, wherein the at least two rudders have a contoured shape.

5. The aircraft of claim 4, wherein the contoured shape has an upper edge and a lower edge and wherein the lower edge runs substantially parallel to an upper surface of the wing portion and wherein the upper edge is contoured to match a shape of the at least two winglets.

6. The aircraft of claim 5, wherein the at least two rudders have a trailing edge that is configured with an alternating tooth pattern such that the alternating tooth pattern extends along the trailing edge from a top portion to a bottom portion of the at least two rudders.

7. The aircraft of claim 1, further comprising rudder support elements disposed within the body of each of the at least two winglets and configured to provide structural support for each of the at least two rudders when the rudders are in the stored position, and wherein the rudder support elements also provide structural support for the at least two winglets when the at least two rudders are in the deployed position.

8. The aircraft of claim 1, further comprising a first and a second rudder control motors, wherein the first and second rudder control motors are disposed within the body of each of the at least two winglets and are mechanically connected to each of the at least two rudders such that each of the control motors can be configured to control the movement of the rudders between the deployed and the stored positions.

9. The aircraft of claim 8, wherein the rudder control motor is connected to a movement control mechanism and wherein the movement control mechanism is moveably connected to each of the at least two rudders by at least one control arm such that the movement of the at least one control arm can position each of the at least two rudders in between the stored position and the deployed position.

10. The aircraft of claim 9, wherein the movement control mechanism is configured to position each of the at least two rudders in more than one deployed position.

11. The aircraft of claim 9, wherein the movement control mechanism positions only some of the rudders in a deployed position and other rudders in the closed position.

12. The aircraft of claim 9, wherein the movement control mechanism comprises a body element configured to act as a housing for the rudder control motor and wherein the actuation of the rudder control motor can cause the movement control mechanism to rotate with the rotation of the motor.

13. The aircraft of claim 12, wherein the at least one control arm is segmented and configured to extend outward from the movement control mechanism when the rudders are in the deployed position and is configured to wrap around the movement control mechanism when the rudders are in the closed position.

14. The aircraft of claim 1, further comprising at least one control surface on a trailing edge of the fixed wing portion.

15. The aircraft of claim 1, further comprising a first and second control surface disposed on one or more trailing edges of the fixed wing portion.

16. The aircraft of claim 15, wherein the first control surface is smaller than the second control surface.

17. The aircraft of claim 16, wherein the first control surface is disposed near a centerline of the aircraft and the second control surface is disposed near the winglets.

18. The aircraft of claim 1, further comprising landing gear, wherein the landing gear is movably connected to a bottom portion of the body of the aircraft such that the landing gear can be placed in a folded position and an open position, wherein in the open position the landing gear is disposed away from the body of the aircraft and wherein when in the closed position the landing gear is disposed near the body of the aircraft.

19. The aircraft of claim 1, wherein the aircraft further comprises a payload device.

20. The aircraft of claim 19, wherein the payload device is disposed on or near a bottom portion of the aircraft such that one or more payload elements are deliverable.

21. The aircraft of claim 20, wherein the payload device comprises a gas system suitable for ejecting one or more payload elements.

22. The aircraft of claim 1, wherein the winglet bodies each further comprise a first connection rod and a second connection rod, the first and second connection rods positioned inside the cross member, the first connection rod connected to a first rudder and a first rudder control mechanism, the second connection rod connected to a second rudder and a second rudder control mechanism, wherein the first and second rudders are rudders among the at least two rudders.

* * * * *